(12) United States Patent
Shiraishi

(10) Patent No.: US 8,175,383 B2
(45) Date of Patent: May 8, 2012

(54) APPARATUS, METHOD, AND PROGRAM PRODUCT FOR IMAGE PROCESSING

(75) Inventor: Shinichi Shiraishi, Kanaguchi (JP)

(73) Assignee: Seiko Epson Corporation, Tokyo (JP)

( * ) Notice: Subject to any disclaimer, the term of this patent is extended or adjusted under 35 U.S.C. 154(b) by 848 days.

(21) Appl. No.: 12/229,032

(22) Filed: Aug. 19, 2008

(65) Prior Publication Data

US 2009/0226085 A1 Sep. 10, 2009

(30) Foreign Application Priority Data

Aug. 20, 2007 (JP) ................................ 2007-213965

(51) Int. Cl.
*G06K 9/00* (2006.01)
(52) U.S. Cl. ........ 382/167; 382/162; 382/274; 382/260; 348/597
(58) Field of Classification Search .................. 382/162, 382/167, 274, 254, 260, 264; 348/597, 606, 348/624; 358/1.9, 3.31, 447, 461
See application file for complete search history.

(56) References Cited

U.S. PATENT DOCUMENTS

| 5,991,512 | A  | * | 11/1999 | Shaked et al. ................. 358/1.9 |
| 7,292,733 | B2 |   | 11/2007 | Monobe et al. |
| 7,973,850 | B2 | * | 7/2011  | Ishiga ........................... 348/335 |
| 8,014,627 | B2 |   | 9/2011  | Guan |
| 2002/0051158 | A1 | * | 5/2002 | Ohkubo ......................... 358/1.9 |
| 2007/0132864 | A1 | * | 6/2007 | Tsuruoka ....................... 348/241 |

FOREIGN PATENT DOCUMENTS

| JP | 2003-230025 A | 8/2003 |
| JP | 2004-159311 A | 6/2004 |
| JP | 2007-201541 A | 8/2007 |

OTHER PUBLICATIONS

Zakhor, "Iterative Procedures for Reduction of Blocking Effects in Transform Image Coding," IEEE Transactions on Circuits and Systems for Video Technology, vol. 2:91-95 (1992).

Wang, et al., "Fast Edge Preserved Postprocessing for Compressed Images," IEEE Transactions on Circuits and Systems for Video Technology, vol. 16:1142-1147 (2006).

Paek, et al., "On the POCS-Based Postprocessing Technique to Reduce the Blocking Artifacts in Transform Coded Images," IEEE Transactions on Circuits and Systems for Video Technology, vol. 8:358-367 (1998).

Paek, et al. "A DCT-Based Spatially Adaptive Post-Processing Technique to Reduce the Blocking Artifacts in Transform Coded Images," IEEE Transactions on Circuits and Systems for Video Technolog, Vol. 10: 36-41 (2000).

* cited by examiner

*Primary Examiner* — Samir Ahmed
*Assistant Examiner* — Ali Bayat
(74) *Attorney, Agent, or Firm* — Nutter McClennen & Fish LLP; John J. Penny, V.

(57) ABSTRACT

From the target image data, a luminance component, a first color difference component, and a second color difference component which represent color of respective pixels are acquired; and a maximum magnitude smoothing process is carried out on the first color difference component.

4 Claims, 26 Drawing Sheets

Fig.7A

LUMINANCE COMPONENT FILTER F1

$$\frac{1}{9} \begin{bmatrix} 1 & 1 & 1 \\ 1 & 1 & 1 \\ 1 & 1 & 1 \end{bmatrix} \leftarrow \text{CEL}$$

Fig.7B

COLOR DIFFERENCE COMPONENT FILTER F2

$$\frac{1}{25} \begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix} \leftarrow \text{CEL}$$

$$\alpha = \frac{BNS}{MAX(BNS)} \quad (0 \leq \alpha \leq 1)$$

Fig.19A

LUMINANCE COMPONENT FILTER F11

$$\frac{1}{\Sigma(\text{EACH ELEMENT})} \begin{bmatrix} \alpha^4 & \alpha^2 & \alpha^4 \\ \alpha^2 & \alpha & \alpha^2 \\ \alpha^4 & \alpha^2 & \alpha^4 \end{bmatrix}\text{— CEL}$$

Fig.19B

COLOR DIFFERENCE COMPONENT FILTER F12

$$\frac{1}{\Sigma(\text{EACH ELEMENT})} \begin{bmatrix} \alpha^2 & \alpha^1 & \alpha^2 \\ \alpha^1 & \alpha & \alpha^1 \\ \alpha^2 & \alpha^1 & \alpha^2 \end{bmatrix}\text{— CEL}$$

ALTERNATIVE EMBODIMENT OF SMOOTHING

Fig.22 ALTERNATIVE EMBODIMENT OF SMOOTHING

Fig.24
ALTERNATIVE EMBODIMENT OF SMOOTHING
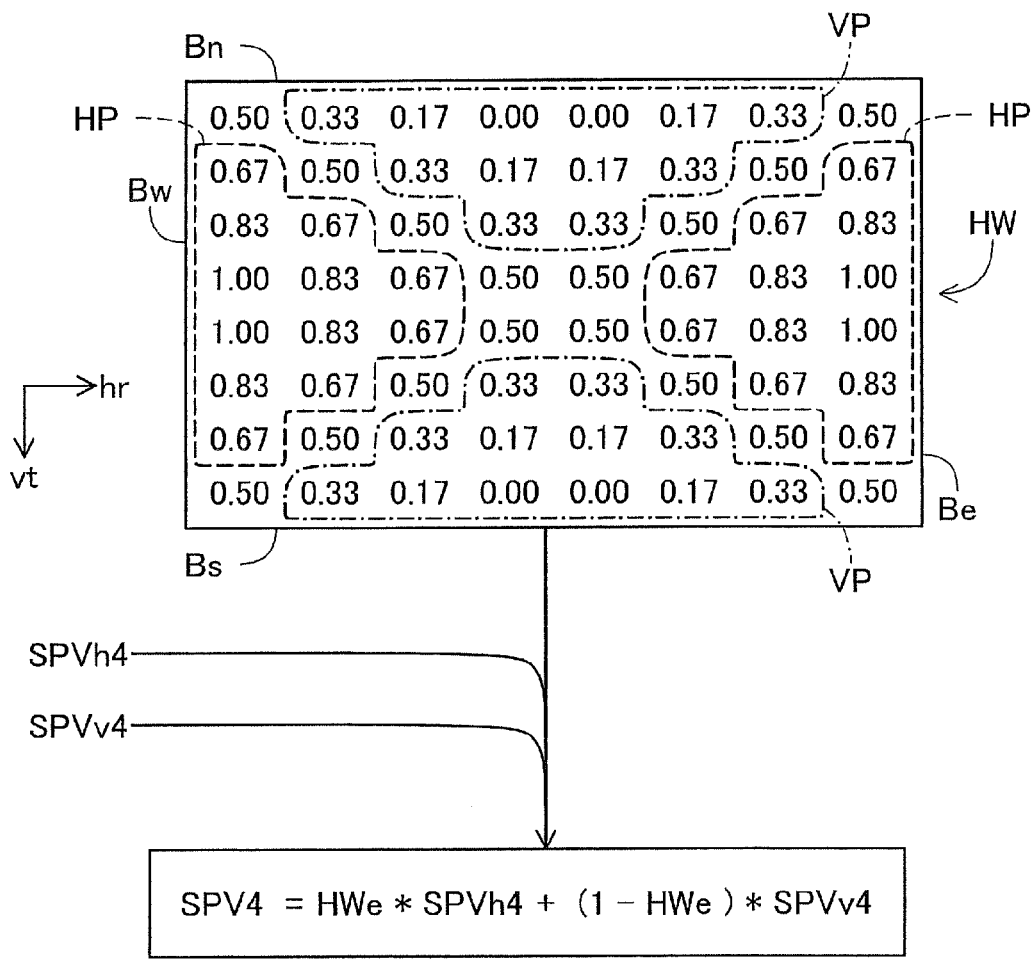
$$SPV4 = HWe * SPVh4 + (1 - HWe) * SPVv4$$
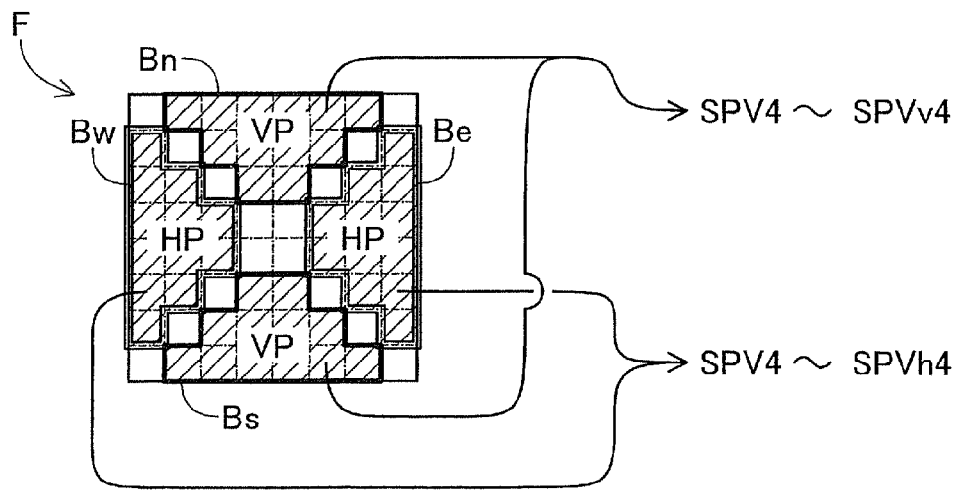

Fig.25

$$SF4 \quad \frac{1}{\Sigma(\text{ELEMENTS})} \begin{bmatrix} 0 & (1-HWe)*\alpha pv3^2 & 0 \\ HWe*\alpha ph3^2 & \begin{array}{c}(1-HWe)*\alpha pv3 \\ + \\ HWe*\alpha ph3\end{array} & HWe*\alpha ph3^2 \\ 0 & (1-HWe)*\alpha pv3^2 & 0 \end{bmatrix}$$

→hr
↓vt

EDGE DIRECTION AND BES

Fig.28
EMBODIMENT OF EDGE DIRECTION CALCULATION
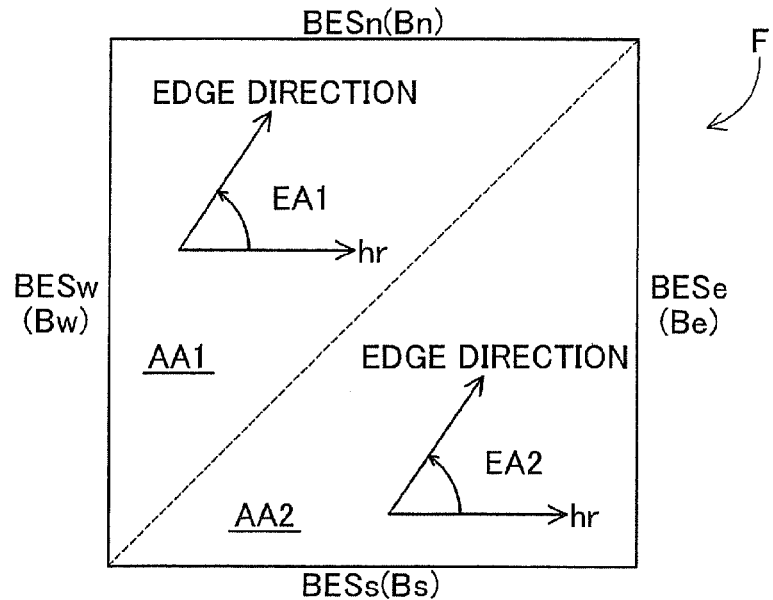
$$DA1 = \tan^{-1}\left(\frac{BESw}{BESn}\right) \quad DA2 = \tan^{-1}\left(\frac{BESe}{BESs}\right)$$
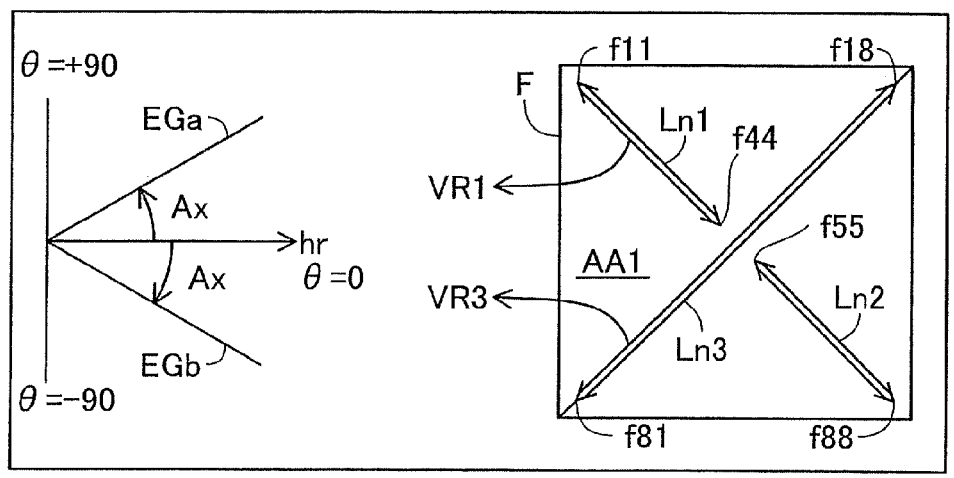
EA1, EA2

Fig.32
EMBODIMENT OF NOISE ADDITION
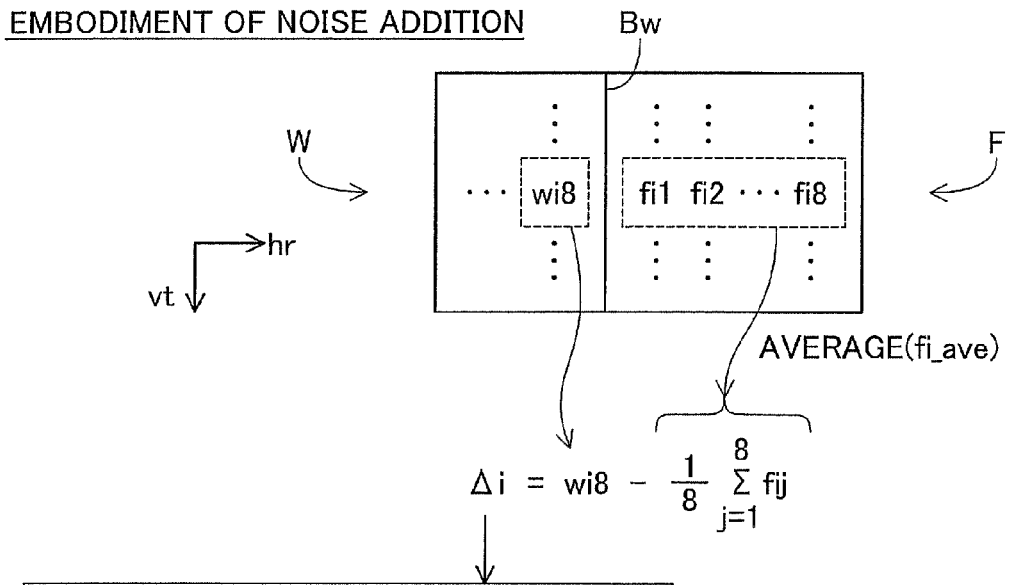
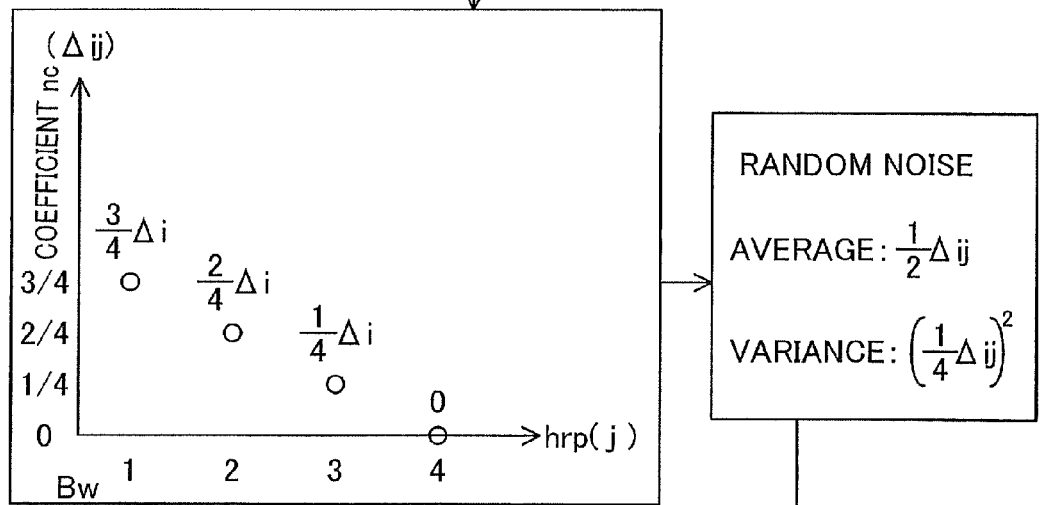
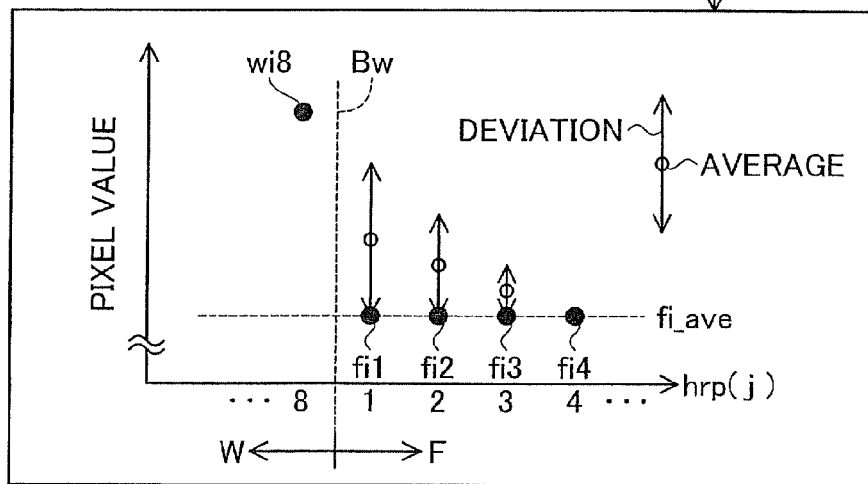

APPARATUS, METHOD, AND PROGRAM PRODUCT FOR IMAGE PROCESSING

CROSS-REFERENCE TO RELATED APPLICATIONS

The present application claims the priority based on Japanese Patent Application No. 2007-213965 filed on Aug. 20, 2007, the disclosure of which is hereby incorporated by reference in its entirety.

BACKGROUND

1. Technical Field

The present invention relates to an apparatus, a method, and a program product for image processing.

2. Description of the Related Art

Colors of pixels of image data can be represented using various color components. For example, the three components of R (red), G (green), and B (blue), or the three components of Y (luminance), Cb, and Cr (color difference), might be used. Noise of various kinds may be included in tone values of such color components. Some examples are noise produced by the image capture element (e.g. a CCD) used to generate the image data; noise produced by the A-D conversion element that converts the analog data from the image capture element to digital data; errors in mathematic operations used to compute the tone values of the color components; and noise occurring with encoding (e.g. compression) of the data. Various processes have been proposed for the purpose of reducing such noise.

SUMMARY

However, there has yet to be devised an innovation that gives sufficient consideration to interrelationships among noise reduction, image blurring, and color components in instances where colors of pixels are represented by multiple color components.

An advantage of some aspects of the present invention is to provide a technology whereby noise can be reduced, while giving consideration to relationships among noise reduction, image blurring, and color components.

According to a first aspect of the present invention, there is provided an image processing device for processing target image data. This image processing device includes a color component acquisition unit and a smoothing processor. The color component acquisition unit, from target image data, acquires a luminance component, a first color difference component, and a second color difference component which represent color of respective pixels. The smoothing processor, at individual pixel positions of at least a partial area of a target image represented by the target image data, carries out a maximum magnitude smoothing process on the first color difference component, among the luminance component, the first color difference component, and the second color difference component.

With this arrangement, since the strongest smoothing process is carried out on the first color difference component, excessive blurring of the image can be suppressed, and noise can be reduced as well. As a result, noise can be reduced while giving consideration to relationships among noise reduction, image blurring, and color components.

The present invention may be embodied in various other aspects, for example, an image processing method and device; a computer program for attaining the functions of such a method or device; or a recording medium having such a computer program recorded thereon.

These and other objects, features, aspects, and advantages of the present invention will become more apparent from the following detailed description of the preferred embodiments with the accompanying drawings.

BRIEF DESCRIPTION OF THE DRAWINGS

FIGS. 7A and 7B are illustrations depicting smoothing filters F1, F2;

FIGS. 19A and 19B are illustrations depicting smoothing filters F1, F2;

FIG. 24 is an illustration depicting an overview of yet another embodiment of the smoothing process;

FIG. 25 is an illustration depicting a smoothing filter;

FIG. 28 is a schematic diagram depicting calculation of edge direction;

FIG. 32 is a schematic diagram depicting noise addition;

DESCRIPTION OF THE PREFERRED EMBODIMENT

Next, the embodiments of the present invention will be described, following the order indicated below.

A. Embodiment 1:
B. Embodiment of Smoothing Process
C. Modified Embodiments:

A. Embodiment 1

Figure 1A:
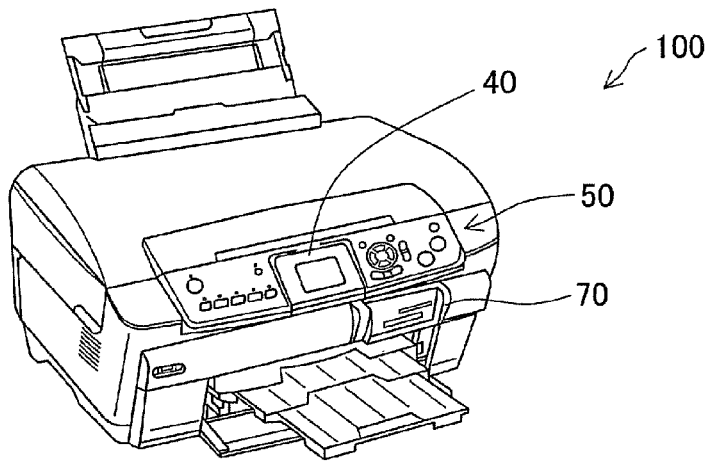
FIGS. 1A and 1B are illustrations depicting a printer according to an embodiment of the present invention.
Figure 1B:
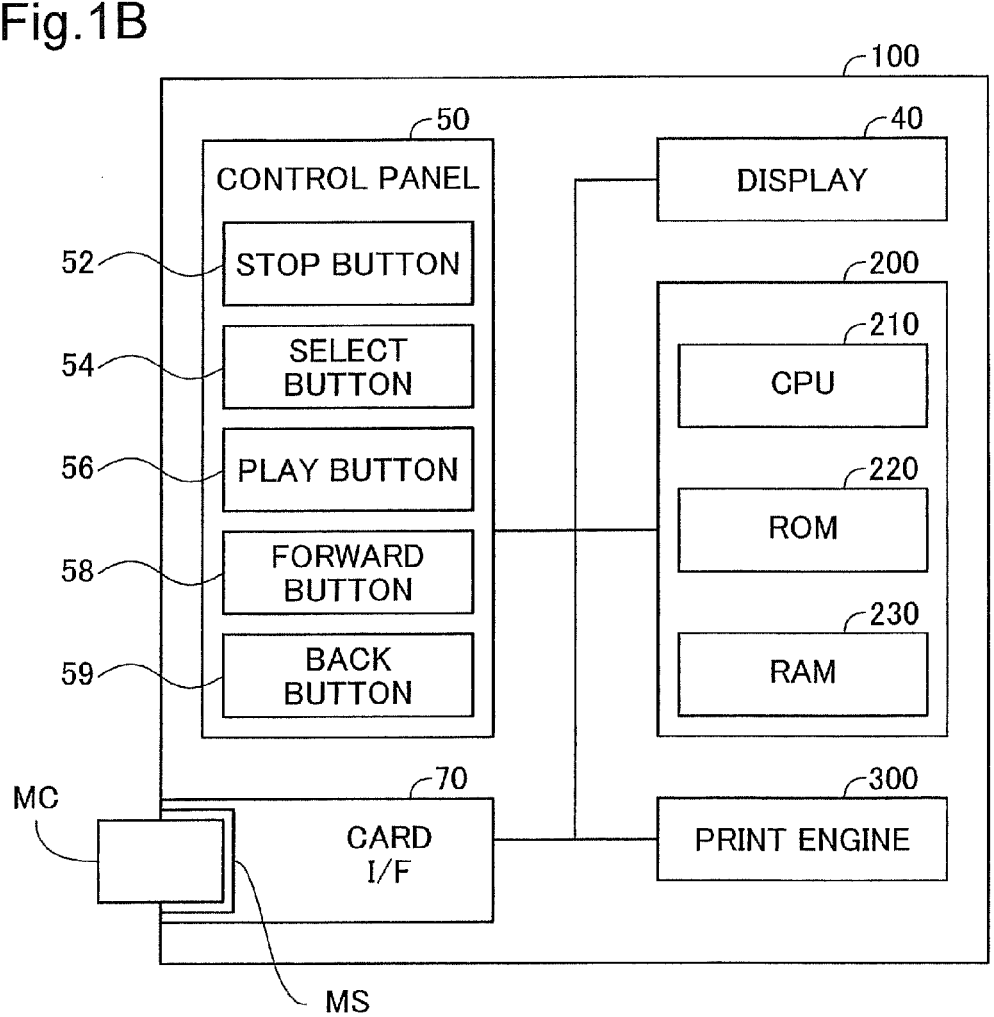

FIGS. 1A and 1B are illustrations depicting a printer according to an embodiment of the present invention. FIG. 1A depicts the exterior of a printer 100; FIG. 1B is a simplified depiction of the configuration of the printer 100. As depicted in FIG. 1A, this printer 100 includes a display 40, a control panel 50, and a memory card interface 70. As depicted in FIG. 1B, the printer 100 further includes a controller 200 and a print engine 300.

The controller 200 is a computer that includes a CPU 210, a ROM 220, and a RAM 230. This controller 200 controls the various constituent elements of the printer 100. The print engine 300 constitutes a printing mechanism for carrying out printing according to print data provided to it. As the printing mechanism, it would be possible to employ various printing mechanisms such as a printing mechanism that forms an image by ejecting drops of ink onto a printing medium, or a printing mechanism that forms an image by transferring and fixing toner to a printing medium. The display 40 displays information of various kinds that includes images. As the display 40, would be possible to employ various displays such as a liquid crystal display or organic EL display. The control panel 50 has a number of buttons including a Stop button 52, a Select button 54, a Play button 56, a Forward button 58, and a Back button 59. When any of these buttons is pressed, a signal indicating that that button is pressed is presented to the controller 200. The control panel 50 functions as an input section for receiving user instructions. This input section is not limited to the control panel 50; various other types of input device, such as a touch panel, could be employed for receiving user instructions. The memory card interface 70 includes a slot MS for insertion of a memory card MC. Data stored on the memory card MC is read by the controller 200 via the memory card interface 70.

Figure 2:
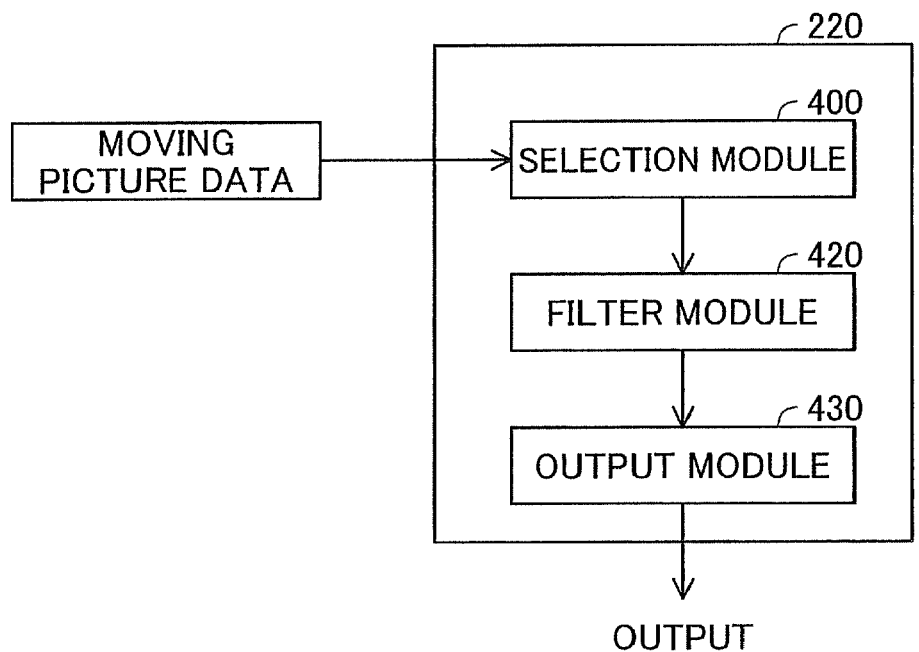
FIG. 2 is an illustration depicting modules that are stored in a ROM 220 (FIG. 1B)

FIG. 2 is an illustration depicting modules that are stored in the ROM 220 (FIG. 1B). In Embodiment 1, a selection module 400, a filter module 420, and an output module 430 are stored in the ROM 220. These modules are programs executed by the CPU 210. It is possible for the modules to exchange data of various kinds through the RAM 230 (FIG. 1B).

Figure 3:
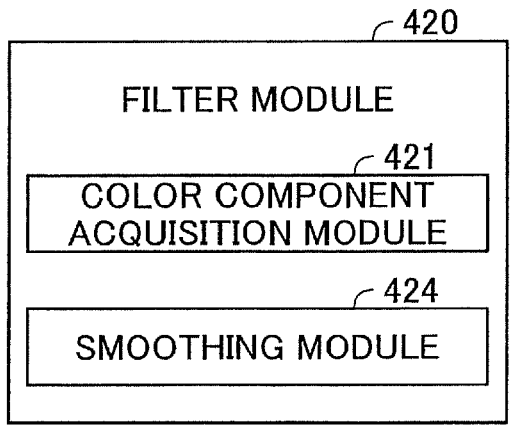
FIG. 3 is an illustration depicting a filter module 420.

FIG. 3 is an illustration depicting the filter module 420. The filter module 420 includes a color component acquisition module 421 and a smoothing module 424. The functions of the modules depicted in FIGS. 2 and 3 will be discussed later.

Figure 4:
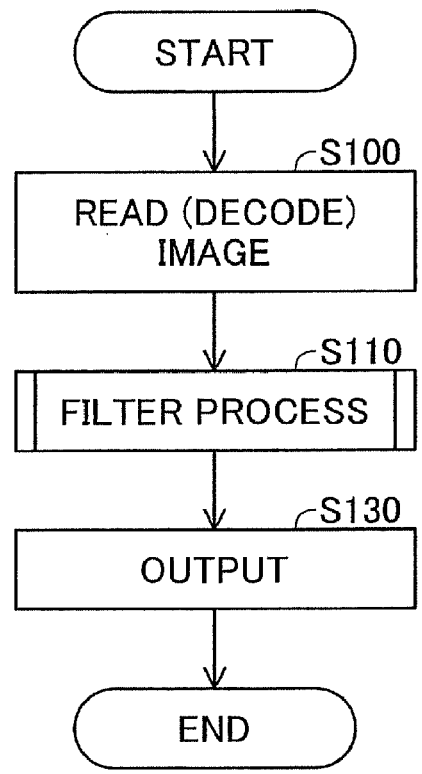
FIG. 4 is a flowchart depicting a procedure of a moving picture process.

FIG. 4 is a flowchart depicting a procedure of a moving picture process. This moving picture process is executed by the controller 200 (FIG. 1B). In this moving picture process, a target image is designated by the user from among a number of still images included in a moving picture, and then the target image is printed out. When the memory card MC storing the moving picture is inserted into the slot MS (FIG. 1B), the controller 200 automatically initiates the moving picture process in response. Alternatively, the controller 200 may initiate the moving picture process according to user instruction.

In the initial Step S100, the selection module 400 (FIG. 2) acquires the moving picture data from the memory card MC and initiates playback of the moving picture. There are various possible formats for the moving picture data such as MPEG (Moving Picture Experts Group) or MotionJPEG. There are the progressive and the interlaced format for the scan formats. In Embodiment 1, the format of the moving picture data is assumed to be the progressive scan MPEG format. Such moving picture data includes a multitude of pictures. These pictures may include so-called I pictures, P picture, and B pictures (not shown). In Embodiment 1, a single picture represents a single frame image (still image) taken at a given point in time.

By decoding each picture, the selection module 400 acquires still image data (frame image data) representing a number of still images arrayed in a time series; the selection module 400 then displays on the display 40 the still images (frame images) represented by the acquired still image data. The selection module 400 then plays back the moving picture by advancing the displayed frame images in order through the time series.

As is well known, a picture in the MPEG format is encoded on a per-pixel block basis. The selection module 400 restores the frame image data by decoding the data of each individual pixel block.

In Step S100 of FIG. 4, the target image is designated by the user. In Embodiment 1, the frame image displayed at the time when the Select button 54 (FIG. 1B) is pressed is used as the target image. While viewing the moving picture displayed on the display 40, the user may press the Select button 54 at the time when the desired shot is displayed. A signal indicating that the Select button 54 is pressed is supplied to the controller 200 from the control panel 50. Hereinbelow, this signal is termed a "designating signal."

In response to the receipt of designating signal, the selection module 400 recognizes that the frame image that is displayed at that point in time has been designated as the target image. In response to receipt of the designating signal, the selection module 400 stops playback of the moving picture. The selection module 400 then supplies the filter module 420 with target image data representing the target image (image data generated through decoding).

In the next Step S110 of FIG. 4, the target image data undergoes a filter process carried out by the filter module 420. This filter process is a process for reducing noise included in the image data. The process will be described in detail later. In response to completion of the filter process, the filter module 420 supplies the processed target image data to the output module 430.

In the next Step S130, the output module 430 initiates printing, using the target image data. The output module 430 uses the target image data to generate print data, and supplies the generated print data to the print engine 300. The print engine 300 then executes printing using the received print data. In response to completion of printing, the moving picture process of FIG. 4 terminates.

Figure 5:
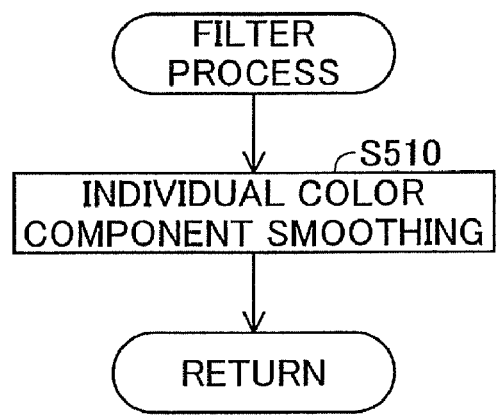
FIG. 5 is a flowchart depicting a procedure of a filter process.
Figure 6:
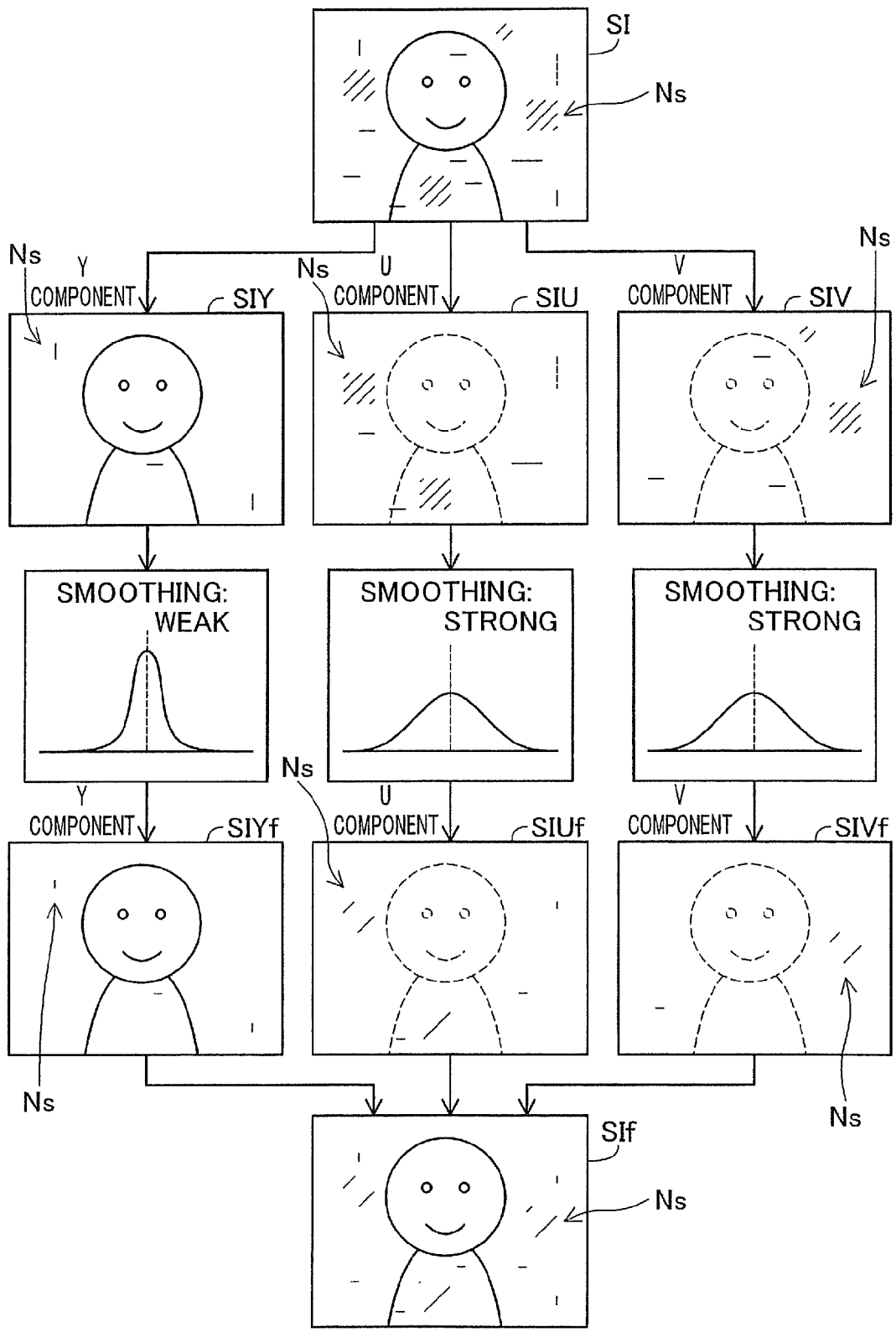
FIG. 6 is a schematic diagram of a smoothing process for individual color components.
Figure 8:
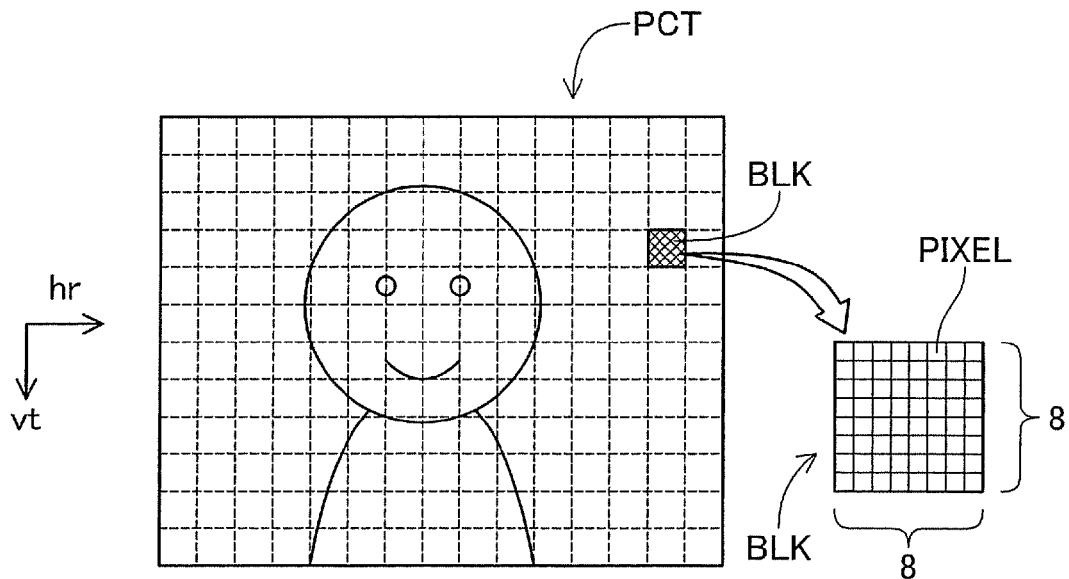
FIG. 8 is a schematic diagram of a picture.

FIG. 5 is a flowchart depicting a procedure of the filter process. In Step S510, smoothing processes are carried out on an individual color component basis. FIG. 6 is a schematic diagram of a smoothing process for individual color components. FIG. 6 depicts an instance of processing of a target image SI. The target image SI includes noise Ns. Various types of noise (e.g. so-called block noise, and noise generated by the image capture element) are included in the noise Ns.

First, from the target image data representing the target image SI, the color component acquisition module 421 acquires the luminance component Y and two color difference components U, V that represent colors of the pixels. In this embodiment, the colors of the pixels of the target image data are represented in the YUV color space. Accordingly, the color component acquisition module 421 acquires the pixel values (tone values of the Y, U and V color components) included in the target image data, without modification, as the color components Y, U, V.

In some instances the target image data may be represented in a color space different from the YUV color space (e.g. the RGB color space). In this case, the color component acquisition module 421 will convert the data from the original color space to the YUV color space to acquire the luminance component Y and the color difference components U, V.

The three images SIY, SIU, and SIV depicted in the second row in FIG. 6 represent images that are represented by the Y, U, and V color components respectively. Each of the images SIY, SIU, SIV includes noise Ns. In this embodiment, the color difference components U, V include stronger noise than does the luminance component Y. The reason is that when the moving picture data utilized in this embodiment is generated, the sampling number of the color difference components U, V is smaller than the sampling number of the luminance component Y (e.g. YUV 422 or YUV 420).

Next, the smoothing module 424 (FIG. 3) performs a smoothing process on each of the three color components Y, U, V. The smoothing module 424 uses two smoothing filters of different strength. FIGS. 7A and 7B are illustrations depicting two smoothing filters F1, F2. In this embodiment, the pixel value of a target pixel is set to a weighted sum derived by assigning weights to the respective pixel values of the target pixel and pixels neighboring the target pixel. The elements of the smoothing filters F1, F2 represent weights. The element location centered on a center element CEL is the same as the pixel location centered on the target pixel. For example, the center element CEL represents the weight of the target pixel, while the element above the center element CEL represents the weight of the pixel above the target pixel.

The magnitude of the smoothing process (hereinafter also called "smoothing magnitude") by the color difference component filter F2 is stronger than the smoothing magnitude by the luminance component filter F1. As the smoothing magnitude becomes stronger, a difference in pixel value between the target pixel and a neighboring pixel becomes smaller. The luminance component filter F1 is used for smoothing of the luminance component Y, while the color difference component filter F2 is used in the smoothing process of the two color difference components U, V.

The three images SIYf, SIUf, and SIVf depicted in the fourth row in FIG. 6 represent images represented by the smoothed Y, U, and V color components respectively. In each of the images SIYf, SIUf, SIVf, noise Ns has been reduced through the smoothing process. As a result, noise Ns is also reduced in the processed target image SIf that is represented by the three processed color components Y, U, V.

In response to completion of the smoothing process, the smoothing module 424 generates processed target image data that represents the processed target image SIf (the colors of the pixels are represented by the processed Y, U, and V color components). The target image data is then supplied to the output module 430 (FIG. 2).

In this embodiment, the weak smoothing process is performed on the luminance component Y in this way. Since the human eye is sensitive to changes in the luminance component Y, excessive blurring of the image can be prevented by decreasing the smoothing magnitude of the luminance component Y. The strong smoothing process is carried out on the color difference components U, V. Since the human eye is insensitive to changes in color difference components U, V, by increasing the smoothing magnitude of the color difference components U, V, noise can be reduced while avoiding excessive blurring of the image. That is, noise can be reduced with consideration to the relationships among noise reduction, image blurring, and color components.

Particularly in cases where, as in this embodiment, the color difference components U, V include stronger noise than does the luminance component Y, advantages of noise reduction produced by increasing the smoothing magnitude of the color difference components U, V will be quite noticeable.

B. Embodiment of Smoothing Process

In the preceding embodiment, the smoothing process is not limited to one that utilizes a predetermined smoothing filter, and various other processes could be employed. For example, a smoothing process dependent on block noise strength could be carried out instead. The block noise is noise that sometimes occurs in the images discussed below. Certain known techniques involve splitting an image into multiple blocks for encoding (e.g. the JPEG format or the MPEG format). The image data is restored from this encoded data by decoding each individual block. Non-reversible processes are one known type of encoding-decoding process of this kind (e.g. non-reversible compression-expansion). In some instances, non-reversible processes of this kind may give rise to block noise in the decoded image data (also called "block distortion"). In order to effectively reduce such block noise, the strength of the block noise may be calculated, and a stronger smoothing process may then be carried out with increasing the noise strength. An embodiment of a smoothing process utilizing block noise strength will be described below.

B1. Embodiment 1 of Smoothing Process Utilizing Block Noise Strength;

FIG. 5 is a schematic diagram of a picture. In this embodiment, a single picture PCT represents a rectangle image. Additionally, the single picture PCT have been split into a plurality of pixel blocks BLK of rectangle shape, with the data encoded on an individual pixel block BLK basis. These pixel blocks BLK are arrayed in lines respectively in the horizontal direction hr and in the vertical direction vt. In the embodiment, each pixel block BLK is a block of 8*8 pixels. The selection module 400 restores the frame image data by decoding the data of each individual pixel block BLK.

Various values may be employed for the pixel count in the horizontal direction hr and the pixel count in the vertical direction vt of the picture PCT. For a given image (subject) represented by the picture PCT, a larger pixel count of the picture PCT means that each single pixel block BLK represents a more detailed portion of the subject. Various values may be employed for the pixel count of a single pixel block BLK.

For the data encoding, it is possible to employ various encoding schemes that combine inter-frame prediction, motion compensation, DCT (discrete cosine transformation), Huffman encoding, and so on. It is acceptable for the data to be compressed through such encoding. In this embodiment, a non-reversible process is employed for the encoding (e.g. some of the high frequency components among the multiple frequency components obtained through DCT are omitted). As a result, block noise may be produced by data decoding. For example, differences in color (pixel values) may be produced along the boundary lines of the pixel blocks BLK.

Inter-frame prediction differs by different picture type. I pictures represent data using coding without prediction; P pictures represent data using forward predictive coding; and B pictures represent data using bidirectional predictive coding. For I pictures, DCT is carried out on original images. For P pictures and B pictures, DCT is carried out on predicted error images generated through inter-frame prediction.

Figure 9:
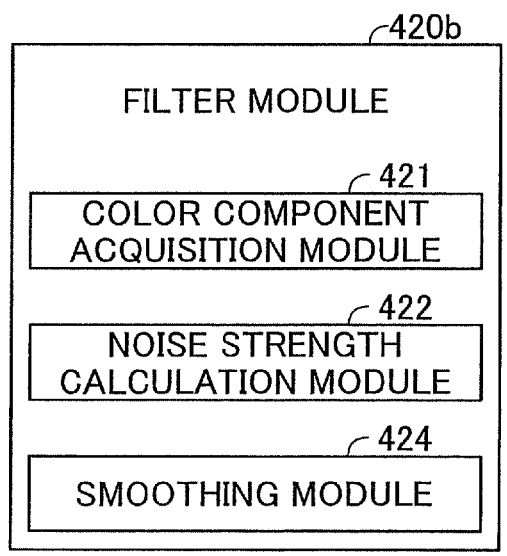
FIG. 9 is an illustration depicting a filter module 420*b*.

FIG. 9 is an illustration depicting a filter module 420b. The only difference from the filter module 420 depicted in FIG. 3 is that a noise strength calculation module 422 is additionally provided.

Figure 10:
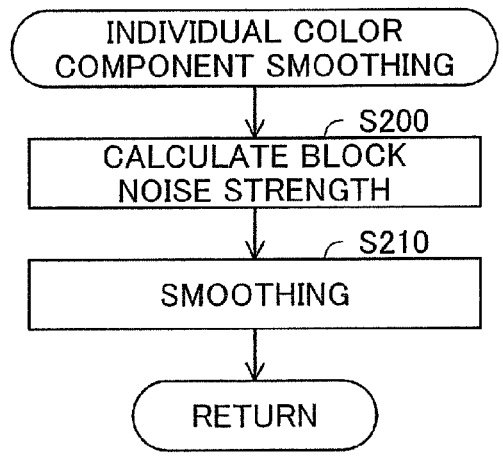
FIG. 10 is a flowchart depicting in detail a procedure of a smoothing process for individual color components.

FIG. 10 is a flowchart depicting in detail procedure of a smoothing process for individual color components. The filter module 420b (FIG. 9) executes the process of Step S510 of FIG. 5, according to the procedure in FIG. 10. In the initial Step S200, the noise strength calculation module 422, using the luminance component Y, calculates block noise strength. In the next Step S210, the smoothing module 424 executes a smoothing process that will be stronger in association with stronger block noise. Block noise is reduced through this smoothing process (also known as a "deblocking process"). Hereinbelow, block noise strength will be discussed first, followed by a discussion of the smoothing process.

Figure 11:
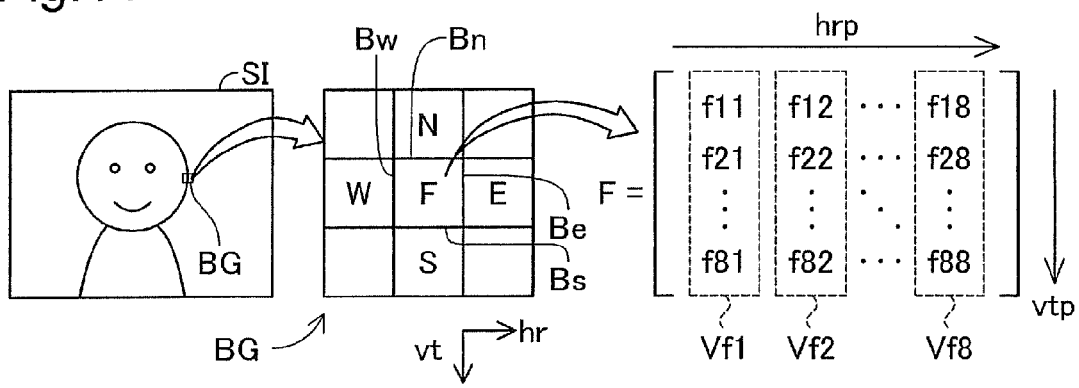
FIG. 11 is an illustration depicting pixel values used to calculate block noise strength.
Figure 12:
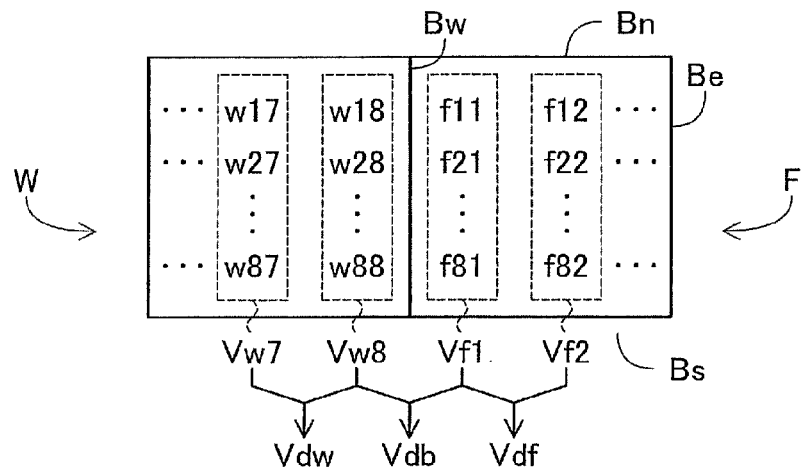
FIG. 12 is an illustration depicting pixel values used to calculate block noise strength.

Block Noise Strength:

FIG. 11 and FIG. 12 are illustrations depicting pixel values used to calculate block noise strength. In this embodiment, the noise strength calculation module 422 (FIG. 9) calculates block noise in relation to the luminance component Y that has been acquired by the color component conversion module 421 (FIG. 9). That is, pixel values of the luminance component Y are used for the block noise strength calculation.

In FIG. 11, the target image SI is shown. The following discussion will focus upon a single pixel block F among the plurality of pixel blocks BLK included in the target image SI (herein this pixel block F is termed the "target pixel block F"). In the drawing, a group BG of 3*3 pixel blocks centered on the target pixel block F is shown enlarged. To the top, right, bottom, and left of this target pixel block F are situated an upper block N, a right block E, a lower block S, and a left block W. Boundary lines Bn, Be, Bs, Bw are respectively defined between the target pixel block F and these four pixel blocks N, E, S, W. The boundary lines Bn, Bs that extend in the horizontal direction hr will also be termed "horizontal boundary lines Bn, Bs." The boundary lines Bw, Be that extend in the vertical direction hr will also be termed "vertical boundary lines Bw, Be."

FIG. 11 depicts 8*8 pixel values f11 to f88 of the target block F. The reference characters representing the pixel values are composed of a letter and two numerals. The letter indicates, in lower case, the letter reference character representing the pixel block. The first numeral indicates pixel position in the vertical direction vt within the pixel block. These are assigned numbers from 1 to 8 in order from the uppermost position to bottom. Pixel position in the vertical direction vt will be referred to below as vertical pixel position vtp. The last numeral indicates pixel position in the horizontal direction hr within the pixel block. These are assigned numbers from 1 to 8 in order towards the right from the leftmost position. Pixel position in the horizontal direction hr will referred to below as horizontal pixel position hrp.

The 64 pixel values f11 to f88 within the target block F are allocated among eight pixel columns Vf1 to Vf8 arrayed in the horizontal direction hr. Each pixel column Vf1 to Vf8 is configured with eight pixel values lined up in the vertical direction vt. The reference characters representing the pixel columns are composed of "V" followed by a letter and a numeral. The letter indicates, in lower case, the letter reference character representing the pixel block. The numeral indicates the horizontal pixel position hrp.

Reference characters based on this same denotation method will also be used for pixel values of other pixel blocks different from the target block F.

FIG. 12 depicts pixel values in proximity to the left boundary line Bw. The illustrated pixel values are used for calculating block noise strength at this left boundary line Bw. This left boundary line Bw lies between the eighth column Vw8 of the left block W and the first column Vf1 of the target block F. The seventh column Vw7 is situated to the left of the eighth column Vw8, and the second column Vf2 is situated to the right of the first column Vf1.

The noise strength calculation module 422 (FIG. 9) first calculates the MSDS (Mean Square Difference of Slopes) by using the pixel columns Vw7, Vw8, Vf1, and Vf2. This MSDS is represented by Numeric Expression 1 below.

$$MSDS = \left\{ \left\| Vdb - \frac{1}{2}(Vdf + Vdw) \right\|_2 ^2 \right\}$$ [Numeric Expression 1]

$$Vdb = Vf1 - Vw8$$

$$Vdf = Vf2 - Vf1$$

$$Vdw = Vw8 - Vw7$$

$$\| \ \|_2 : L2 \text{ NORM}$$

The sum of two pixel columns is calculated in the same way as the sum of matrixes. Also, the difference of two pixel columns is calculated in the same way as the difference of matrixes. In other words, each pixel column is utilized in the calculation as an 8-dimensional column vector. For example, an 8-dimensional column vector whose value for the i-th row is "fi1−wi8" is calculated through the calculation "Vf1−Vw8." The L2 norm is termed the two-dimensional norm, and is an operation that involves calculating Euclidean distance. Typically a p-dimensional norm (where p is an integer $\geq 1$) is represented by Numeric Expression 2 below.

$$\|x\|_p = \left( \sum_{i=1}^{n} |x_i|^p \right)^{1/p}$$ [Numeric Expression 2]

$$= \sqrt[p]{|x_1|^p + |x_2|^p + \ldots + |x_n|^p}$$

$\| \ \|_p : p - \text{dimensional NORM}$ $x$: numerical sequence including $n$ elements $x_i (1 \leq i \leq n)$ The boundary difference column Vdb used for calculation of the MSDS represents the difference between the two pixel columns Vf1, Vw8 neighboring the left boundary line Bw to either side. This boundary difference column Vdb represents the variation rate of pixel values on the left boundary line Bw, in the direction orthogonal to the left boundary line Bw. The variation rate of pixel values means the amount of variation in pixel values per unit length. In this embodiment, the amount of variation in pixel value per single pixel is used as the variation rate of pixel values.

The first internal difference column Vdf represents pixel value difference between the two pixel columns Vf1 and Vf2 within the target block F. These pixel columns Vf1 and Vf2 are the two pixel columns that are closest to the left boundary line Bw (the first pixel column Vf1 adjacent to the left boundary line Bw, and the second pixel column Vf2 adjacent to this first pixel column Vf1). This first internal difference column Vdf represents the variation rate of pixel values in the direction orthogonal to the left boundary line Bw within the target block F.

The second internal difference column Vdw is a difference column calculated in relation to the left block W, in the same manner as the first internal difference column Vdf. The two pixel columns Vw8, Vw7 within the left block W that are closest to the left boundary line Bw are utilized in calculating the second internal difference column Vdw.

The MSDS is calculated using the difference between the boundary difference column Vdb and the average of the two internal difference columns Vdf, Vdw. This difference represents the second order derivative of the variation rate of pixel values viewed along the direction orthogonal to the left boundary line Bw. This difference (second order derivative) will increase in association with the variation rate on the left boundary line Bw diverging to a greater degree compared with the variation rate on either side of the left boundary line Bw. That is, this difference (second order derivative) will increase in association with block noise occurring along the left boundary line Bw.

Figure 13:
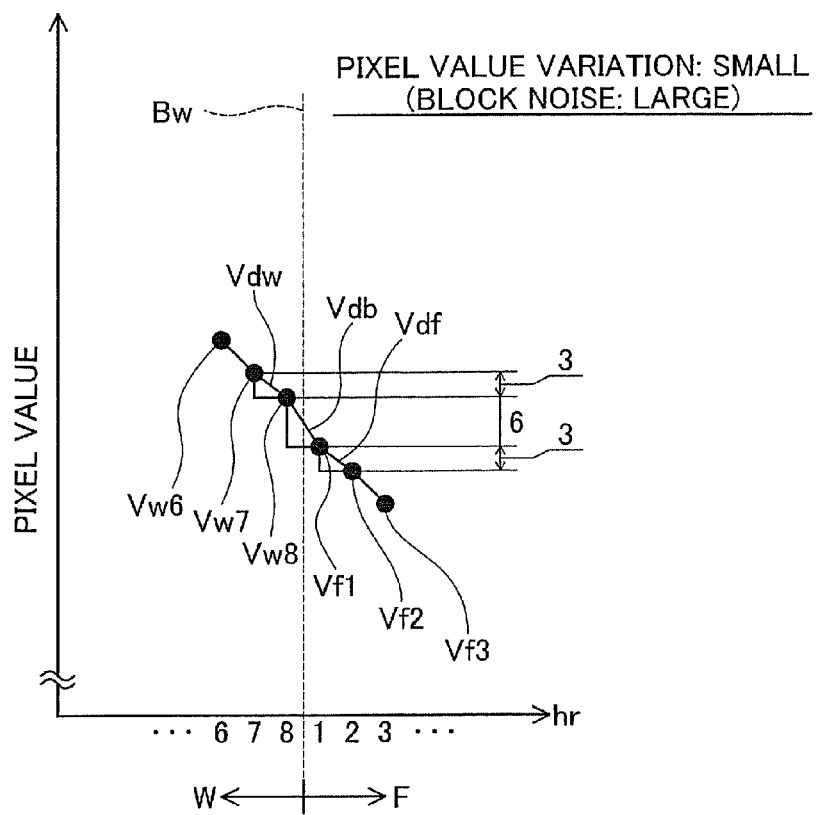
FIG. 13 is a graph depicting an example of variation of pixel values, viewed along a direction orthogonal to a left boundary line Bw.

FIG. 13 is a graph depicting an example of variation of pixel values, viewed along a direction orthogonal to the left boundary line Bw. The horizontal axis indicates pixel position in the horizontal direction hr. The numerals on the horizontal axis indicate horizontal pixel position hrp. The vertical axis indicates pixel values. In this embodiment, pixel values are set to integer values within a range from 0 to 255. A representative single line intersecting the left boundary line Bw is shown in the graph. Pixel values of the six pixel columns close to the left boundary line Bw (Vw6 to Vw8, Vf1 to Vf3) are shown in the graph. In the graph of FIG. 13, pixel values decrease slowly as pixel position shifts from the left block W towards target block F. Such a gradual variation of pixel values will be produced when, for example, the pixel blocks W and F represent gradual gradation.

In FIG. 13, pixel value variation within each of the pixel blocks F, W is small, and the differences represented by the internal difference columns Vdf, Vdw are "3." Meanwhile, the difference represented by the boundary difference column Vdb is "6," which is greater than the difference of the internal difference columns. In this way, pixel values vary in stepwise fashion on the left boundary line Bw. Here, the other seven lines that intersect the left boundary line Bw exhibit similar variation of pixel values. That is, stepwise variations of pixel values in the direction orthogonal to the left boundary line Bw are produced alongside the left boundary line Bw.

Such stepwise changes of pixel values along the left boundary line Bw may occur due to non-reversible encoding and decoding (i.e. block noise), even where the changes are not present in the original image. In areas of gradual change in pixel values such as depicted in FIG. 13, such stepwise changes of pixel values alongside the left boundary line Bw will tend to stand out (apparent block noise strength will be strong). As shown in FIG. 12, the difference columns Vdb, Vdf, Vdw used to calculate the MSDS each represent pixel value differences between pixel columns that are parallel to the left boundary line Bw. Accordingly, when block noise is produced along the left boundary line Bw, the MSDS will be large.

Figure 14:
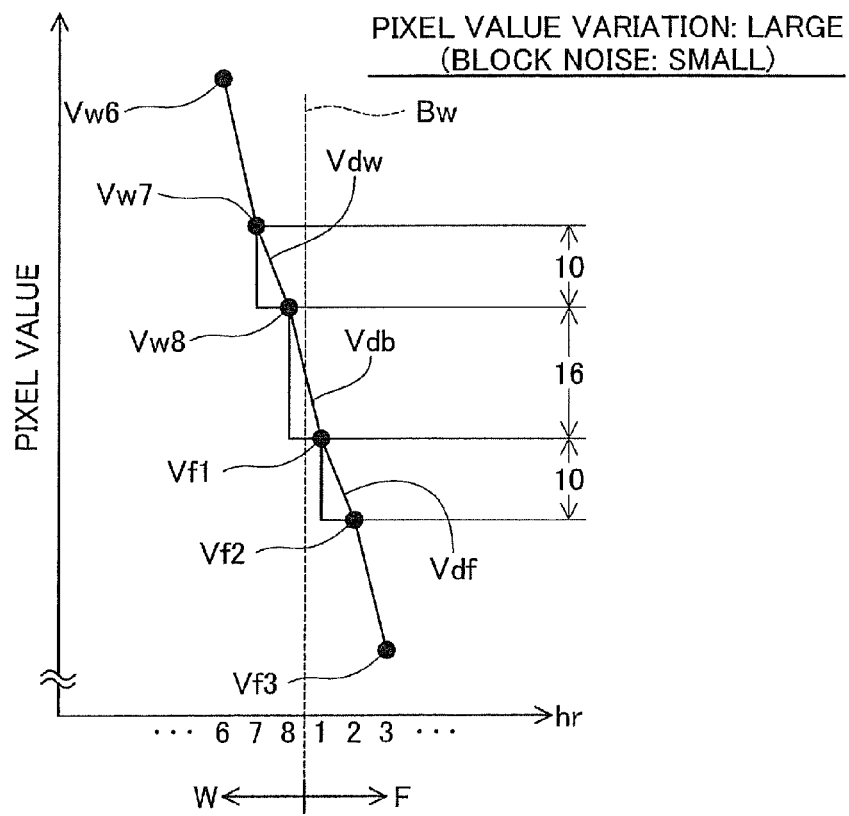
FIG. 14 is a graph depicting another example of variation of pixel values.

FIG. 14 is a graph depicting another example of variation of pixel values. The vertical axis and the horizontal axis are the same as in the example in FIG. 13. In the example in FIG. 14, in contrast to the example in FIG. 13, pixel values decrease rapidly when pixel position shifts from the left block W towards target block F. In particular, there is large variation of pixel values within the pixel blocks W, F as well. Such sharp variation in pixel values can occur, for example, where the pixel blocks W, F represent that edge of a subject which extends parallel to the left boundary line Bw. Particularly where the pixel blocks W, F represent a subject having numerous edges (e.g. a lawn), there will be large variations of pixel values within the blocks.

In FIG. 14, the differences represented by the internal difference columns Vdf, Vdw are "10." The difference represented by the boundary difference column Vdb is "16." The other seven lines that intersect the left boundary line Bw exhibit similar variation of pixel values. That is, relatively large variations of pixel values are produced alongside the left boundary line Bw. The ratio (16/10) of variation on the left boundary line Bw (16) to variation in proximity to the left boundary line Bw (10) is much smaller than the ratio (6/3) in the example of FIG. 13. Where the ratio of variation is small as in this instance, block noise will not readily stand out (apparent block noise strength will be weak). However, the aforementioned MSDS will be large.

This characteristic of the MSDS may also be shown arithmetically. Numeric Expression 3 below gives a relational expression derived by applying the triangle inequality to Numeric Expression 1 that represents the MSDS.

$$\sqrt{MSDS} \leq \frac{1}{2}(\|2*Vdb\|_2 + BES) \quad \text{[Numeric Expression 3]}$$

$$BES = \|Vdf\|_2 + \|Vdw\|_2$$

The block internal edge strength BES (hereinafter also termed "edge strength BES") represents the magnitude of the variation rate of pixel values in the direction orthogonal to the left boundary line Bw within each of the blocks F, W. Where the pixel blocks F, W represent edges of a subject in an image as shown in FIG. 14, the edge strength BES will be high. Accordingly, the edge strength BES can be thought of as representing edge strength in the pixel block interior. As shown by Numeric Expression 3, where this edge strength BES is high, the upper limit of the square root of the MSDS will be large. That is, where edge strength BES is high, MSDS may be large even in instances where block noise does not stand out.

Consequently, in this embodiment, a value represented by Numeric Expression 4 below is utilized as the block noise strength BNS.

$$BNS = \frac{\sqrt{MSDS}}{BES} \quad \text{[Numeric Expression 4]}$$

$$= \frac{\|2*Vdb - (Vdf + Vdw)\|_2}{2(\|Vdf\|_2 + \|Vdw\|_2)}$$

As indicated by Numeric Expression 4, block noise strength BNS is a value derived by dividing the square root of the MSDS by the edge strength BES. As a result, the block noise strength BNS will become smaller as variation rates (Vdw, Vdf) of pixel values within the pixel block become greater. For example, for the left boundary line Bw in an area of small variation of pixel values as depicted in FIG. 13, high block noise strength BNS would be calculated. For the left boundary line Bw in an area of large variation of pixel values as depicted in FIG. 14, low block noise strength BNS would be calculated. As a result, it will be possible for the block noise strength BNS to appropriately reflect the apparent block noise strength.

The edge strength BES can be a value of "0." In this case, where "MSDS>0" is true, the BNS is set to a predetermined maximum value. This predetermined maximum value is a definitional maximum value of block noise strength BNS where edge strength BES is not "0." This definitional maximum value is the same as a hypothetical BNS obtained where, for example, the edge strength BES has the minimum value "1" greater than 0, and all of the eight elements of the Vdb have the maximum value of "255." One example of a case where the edge strength BES is "1" is one where a single element among the eight elements of the first internal d difference column Vdf is "1" and the other seven elements are "0," while all eight of the elements of the second internal d difference column Vdw are "0." Even if the edge strength BES is "0," if "MSDS>0" is not true, the BNS is set to "0."

While block noise strength BNS for the left boundary line Bw is described above, block noise strength BNS for the other boundary lines Bn, Be, and Bs (FIG. 11) are calculated analogously. Here, for the horizontal boundary lines Bn, Bs, pixel rows are used in place of pixel columns as 8-dimensional vectors.

Figure 15:
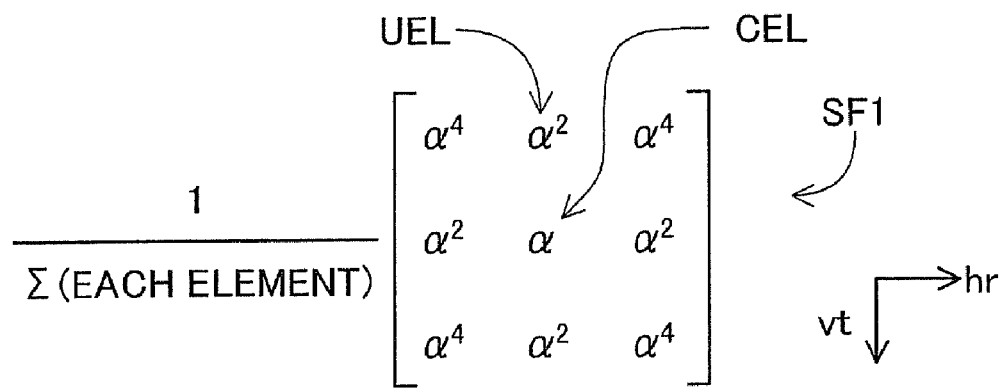
FIG. 15 is an illustration depicting a smoothing filter.

Smoothing Process:

The smoothing process will now be described. FIG. 15 is an illustration depicting a smoothing filter. The smoothing module 424 (FIG. 3) uses this smoothing filter SF1 to perform the smoothing process on each of the plurality of pixels included in the target image. This smoothing filter SF1 is a 3*3 matrix. In this embodiment, a pixel value of a target pixel is set to the weighted sum of pixel values of nine pixels, namely, the target pixel and eight neighboring pixels. The arrangement of the nine elements centered on the center element CEL is the same as the arrangement of nine pixels centered on the target pixel. For example, the center element CEL indicates the weight of the target pixel, and the element UEL above the center element CEL indicates the weight of the pixel above the target element.

Each element of the smoothing filter SF1 is represented using normalized strength $\alpha$ (alpha). This normalized strength $\alpha$ is a value obtained through normalization of the aforementioned block noise strength BNS to a range from 0 to 1. Such normalization is carried out by dividing the block noise strength BNS by its maximum value (MAX(BNS)). In FIG. 15, "1/Σ(each element)" means that each element (e.g. $\alpha, \alpha^2, \alpha^4$) of the illustrated matrix is divided by the sum of the nine elements. By so doing, each element of the smoothing filter SF1 is set so that the sum of the nine elements is "1." As a result, the pixel values subsequent to the smoothing process will be prevented from being set to excessively large values or to excessively small values. Where $\alpha$ is "zero," the smoothing module 424 does not carry out the smoothing process.

Each element of the smoothing filter SF1 is represented by a power of the normalized strength $\alpha$. The exponent is set to a higher value with increasing distance from the center element CEL (the target pixel). Specifically, the exponent of the center element CEL is "1"; the exponent of the elements above, below, and to left and right is "2"; and the exponent of the elements at the four corners is "4." As a result, each element becomes smaller with increasing distance from the center element CEL (the target pixel).

Figure 16:
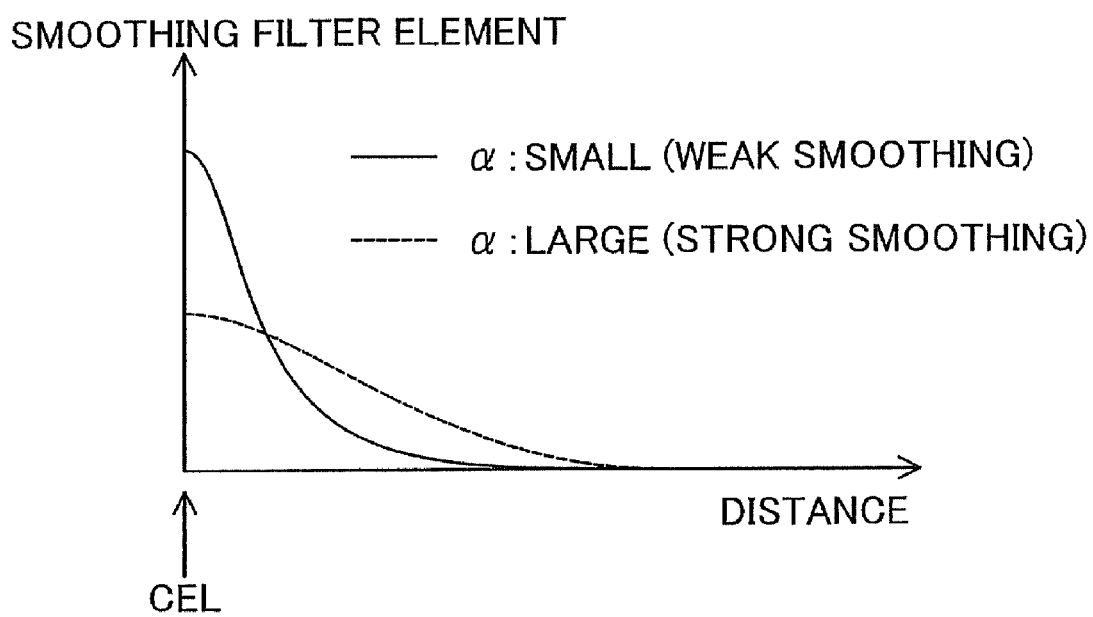
FIG. 16 is a graph depicting a relationship between elements of a smoothing filter SF1 and distance from a center element CEL (target pixel)

FIG. 16 is a graph depicting a relationship between the elements of the smoothing filter SF1 and distance from the center element CEL (the target pixel). The horizontal axis shows distance, and the vertical axis shows the elements. Where the normalized strength $\alpha$ is large, changes in elements will be small in relation to changes in distance. That is, the differences between the weight of the target pixel and the weights of the neighboring pixels will be small. As a result, magnitude of smoothing will be strong. Specifically, the differences in pixel values between the target pixel and the neighboring pixels will become very small. On the other hand, if the normalized strength $\alpha$ is small, changes in elements will be large in relation to changes in distance. That is, the weights of the neighboring pixels will be very small in comparison with the weight of the target pixel. As a result, the magnitude of smoothing will be weak. Specifically, the amounts of decreases in the differences of pixel values between the target pixel and the neighboring pixels will be small.

Figure 17:
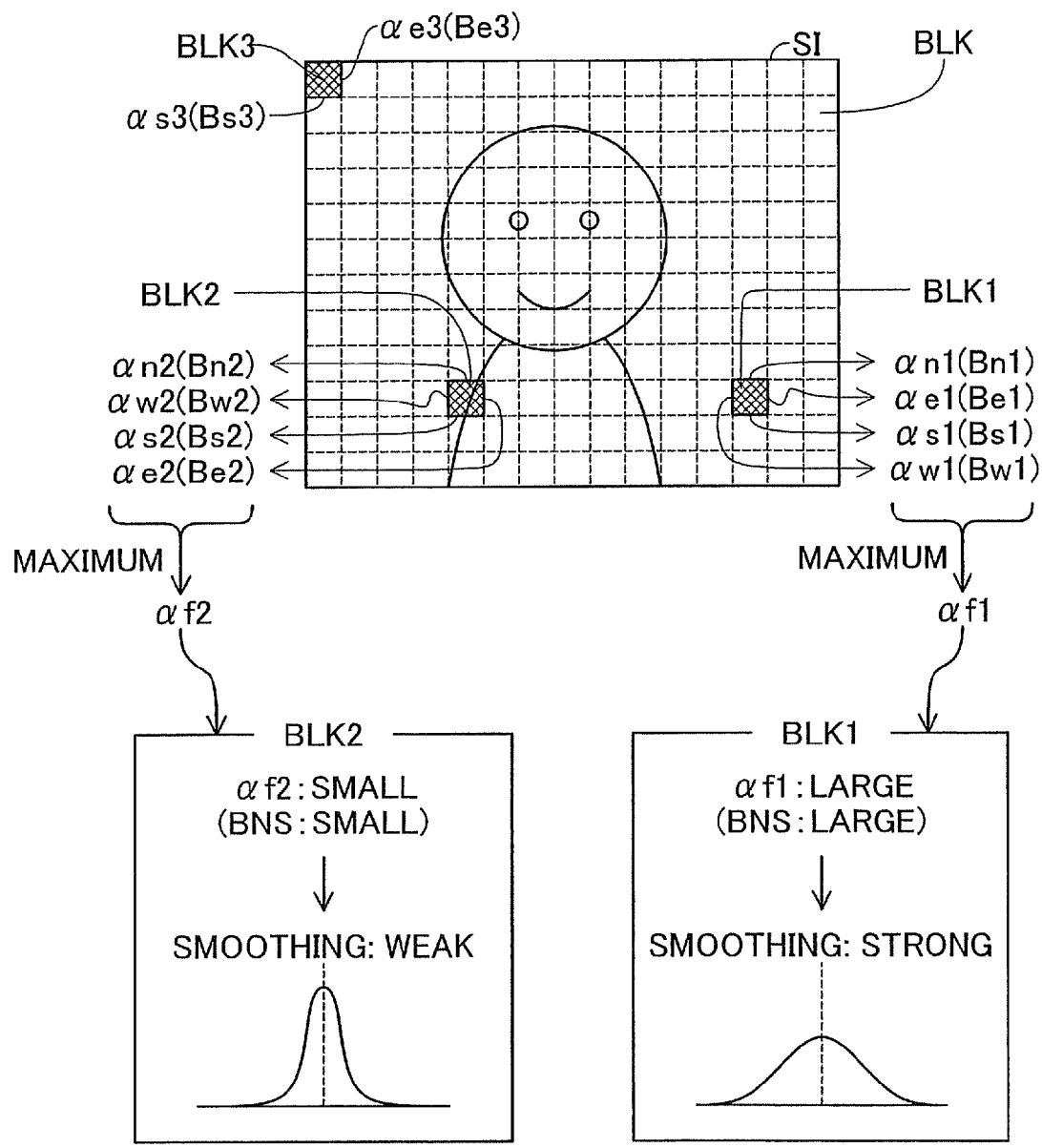
FIG. 17 is an illustration depicting an overview of a smoothing process.

FIG. 17 is an illustration depicting an overview of the smoothing process. The target image SI is shown in the drawing. Also depicted in the drawing are overviews of the smoothing process for a first pixel block BLK1 and for a second pixel block BLK2 among the plurality of pixel blocks included in the target image SI.

As noted previously, a single pixel block is bounded by four boundary lines Bn, Be, Bs, Bw; and the noise strength calculation module 422 (FIG. 9) calculates the block noise strength BNS for each boundary line. As a result, it will be possible to utilize four normalized strengths $\alpha$ in relation to a single pixel block. Consequently, in this embodiment, the smoothing module 424 utilizes a representative value calculated from the four normalized strengths to carry out the smoothing process on a single pixel block. As the representative value, it would be possible to use various values represented by a function of the four normalized strengths (e.g. the average value, the maximum value, the median value, or the minimum value). In this embodiment, the maximum value is employed. By employing the maximum value, remaining block noise can be suppressed.

For example, for the four boundary lines Bn1, Be1, Bs1, Bw1 of the first pixel block BLK1, four normalized strengths $\alpha n1, \alpha e1, \alpha s1, \alpha w1$ are respectively calculated. Using a representative value $\alpha f1$ of these normalized strengths $\alpha n1, \alpha e1, \alpha s1, \alpha w1$, the smoothing module 424 then determines each element of the smoothing filter SF1 (FIG. 15). In this embodiment, the maximum value is employed as the representative value $\alpha f$. The smoothing filter SF1 determined in this way then is used to carry out the smoothing process on all pixels within the first pixel block BLK1.

Similarly, for the four boundary lines Bn2, Be2, Bs2, Bw2 of the second pixel block BLK2, four normalized strengths $\alpha n2, \alpha e2, \alpha s2, \alpha w2$ are respectively calculated. Using a representative value $\alpha f2$ of these normalized strengths, the smoothing module 424 then determines each element of the smoothing filter SF1. The smoothing filter SF1 determined in this way then is used to carry out the smoothing process on all pixels within the second pixel block BLK2.

Here, it is assumed that the first representative value $\alpha f1$ is greater than the second representative value $\alpha f2$. In this case, a strong smoothing process is carried out on the pixels of the first pixel block BLK1, and a weak smoothing process is carried out on the pixels of the second pixel block BLK2.

The smoothing processes are carried out analogously for the pixels of the other pixel blocks as well. In this way, the noise strength calculation module 422 (FIG. 9) calculates the block noise strength BNS in relation to each of the plurality of boundary lines included in the target image SI (FIG. 10: S200). The smoothing module 424 then determines the smoothing filter SF1 (FIG. 15) for each individual pixel block, and executes the smoothing process on each pixel within the pixel block (FIG. 10: S210). Computation of the block noise strength BNS and the smoothing process in relation to a single pixel block may be executed repeatedly while switching the pixel block. Also, for pixel blocks at the edges of the target image SI, normalized strength α (block noise strength BNS) of a part of boundary line bordering another pixel block may be used. For example, for the pixel block BLK3 situated in the upper left corner, a representative value calculated from the normalized strength αe3 of the right boundary line Be3 and the normalized strength αs3 of the lower boundary line Bs3 may be used.

As described above, in this embodiment, the magnitude of the smoothing becomes stronger with increasing the normalized strength α, that is, with increasing the block noise strength BNS. As a result, in areas of small block noise strength BNS, excessive smoothing can be suppressed so blurring of the image can be suppressed. In areas of large block noise strength BNS on the other hand, block noise can be reduced through strong smoothing.

Smoothing of the luminance component Y has been described above. For the color difference components U, V, like the luminance component Y, the smoothing module 424 carries out a smoothing process at a magnitude dependent upon a representative value αf. Note that, the magnitude of smoothing of the color difference components U, V at each pixel location is higher than that of the luminance component Y.

Figure 18:
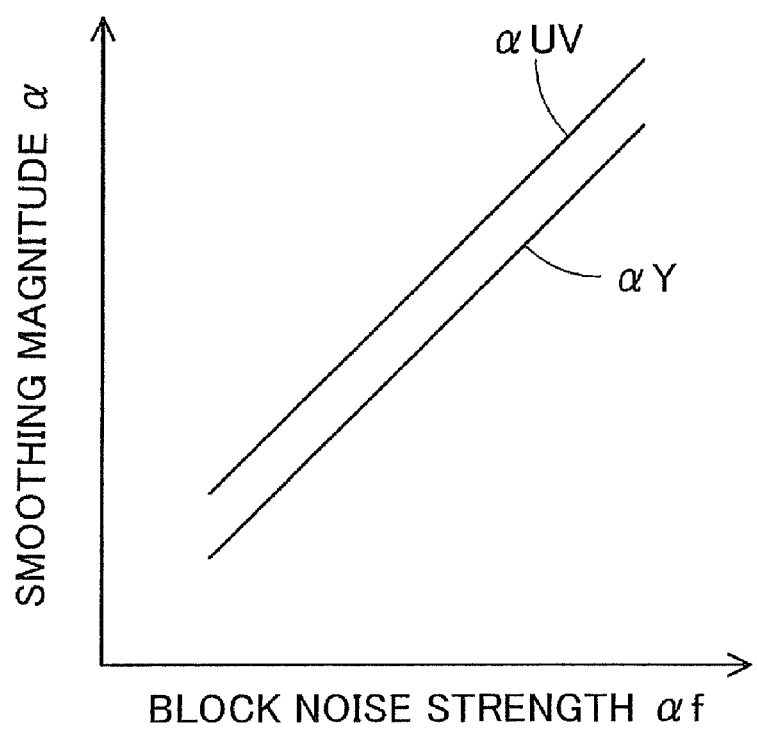
FIG. 18 is a graph depicting relationships between noise strength and smoothing magnitude.

FIG. 18 is a graph depicting relationships between noise strength and smoothing magnitude. The horizontal axis indicates block noise strength αf, and the vertical axis indicates smoothing magnitude α. The block noise strength αf shows a representative value of normalized strength calculated on a per-block basis (FIG. 17). The smoothing magnitude shows the value α used to determine the elements of the filter depicted in FIG. 15. The first smoothing magnitude αY is applied to the luminance component Y, while the second smoothing magnitude αUV is applied to the color difference components U, V.

Each smoothing magnitude αY, αUV has been established in advance so as to be stronger with increasing the block noise strength αf. As noted above, the representative value αf is utilized without modification as the first smoothing magnitude αY. Also, the second smoothing magnitude αUV is set so as to be greater than the first smoothing magnitude αY in instances where the block noise strength αf is the same. As a result, at each individual pixel position, the strongest smoothing process is carried out on the color difference components U, V. Also, at each individual pixel position, the magnitude of smoothing of each of the color difference components U, V is stronger than the smoothing magnitude of the luminance component Y. As a result, excessive blurring of the image can be suppressed, and noise can be reduced.

It is possible to employ various values as the magnitude αUV. For example, a value derived by adding a predetermined positive value to the first smoothing magnitude αY may be employed as the magnitude αUV. Or, a value derived by multiplying the first smoothing magnitude αY by a predetermined value greater than 1 may be employed as the magnitude αUV.

Also, smoothing filters represented in a different format from that of the luminance component Y may be applied to the color difference components U, V. FIGS. 19A and 19B are illustrations depicting two smoothing filters F11, F12. Each of the filters F11, F12 is a 3*3 matrix. The eight elements surrounding the center element CEL are represented by powers of the normalized strength α. The luminance component filter F11 is the same as the smoothing filter SF1 depicted in FIG. 15. On the other hand, in the color difference component filter F12, the exponent of each element is smaller than the exponent of the element at the equivalent position in the luminance component filter F11. Consequently, for the same normalized strength α, the smoothing magnitude of the color difference component filter F12 is stronger than the smoothing magnitude of the luminance component filter F11. Where such filters F11, F12 are used, a stronger smoothing process can be carried out on the color difference components U, V than on the luminance component Y.

Figure 20:
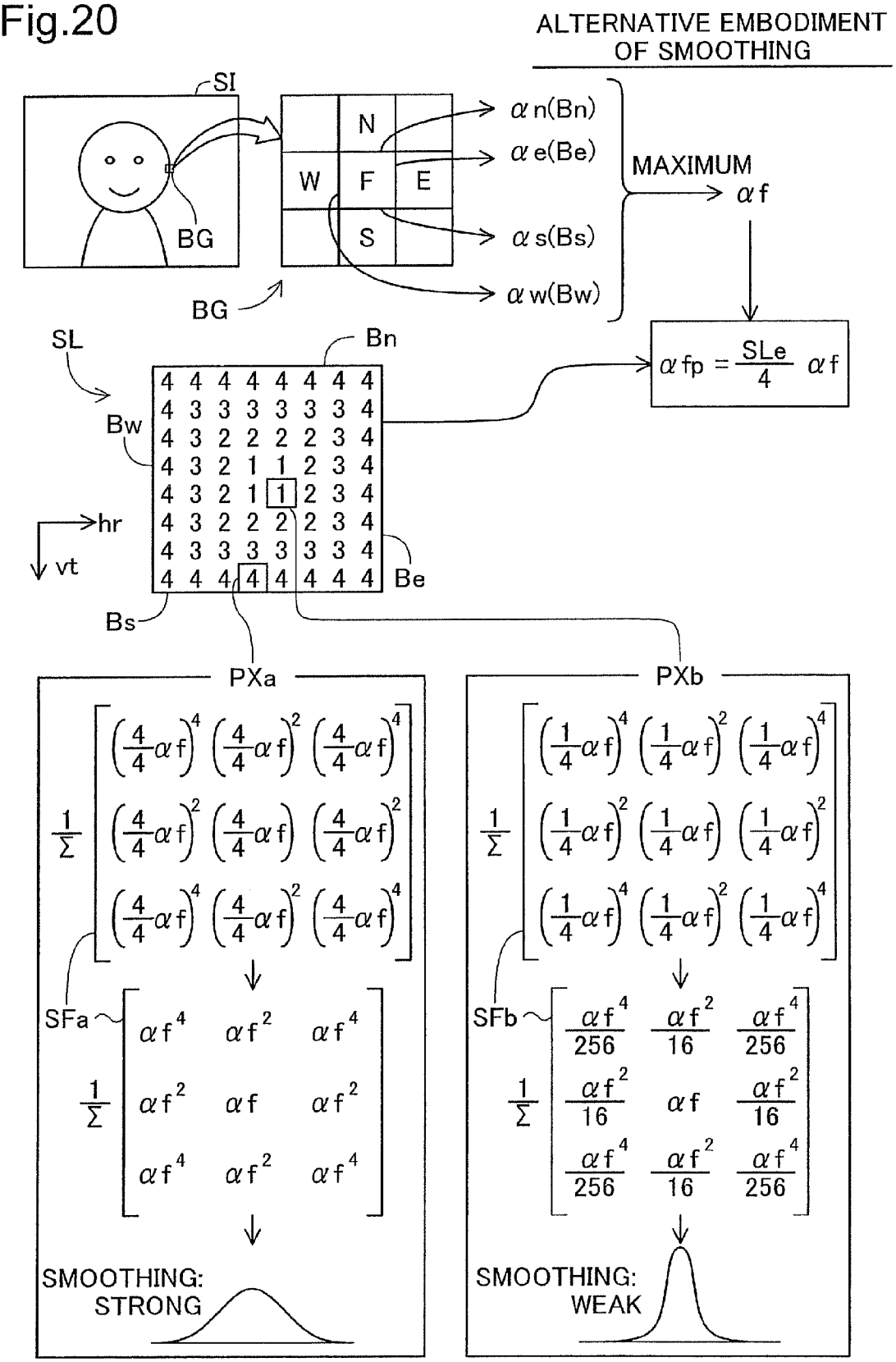
FIG. 20 is an illustration depicting an overview of another embodiment of the smoothing process.

B2. Embodiment 2 of Smoothing Process Utilizing Block Noise Strength:

FIG. 20 is an illustration depicting an overview of another embodiment of the smoothing process. The only difference from the embodiment depicted in FIG. 17 is that the magnitude of smoothing becomes stronger as the pixel position within a pixel block become closer to the boundary line. The device configuration and process steps are the same as in the embodiment illustrated in FIGS. 1A-1B, FIG. 2, FIG. 9, and FIG. 10.

The drawing depicts an example of a smoothing level matrix SL. This 8*8 matrix SL indicates a smoothing level at each pixel position within a pixel block. In the example of FIG. 20, the level is set to any of levels 1 to 4. Higher levels mean stronger smoothing. Also, the level is set to a greater value with decreasing distance from the boundary line Bn, Be, Bs, Bw of the pixel block.

The drawing depicts the target image SI and the pixel block group BG similar to those in FIG. 11. The smoothing module 424 (FIG. 9) determines a representative normalized strength αf from the four normalized strengths αn, αe, αs, αw that correspond respectively to the four boundary lines Bn, Be, Bs, Bw. Then, on the basis of a value αfp derived by multiplying a coefficient "SLe/4" by the representative value αf, the smoothing module 424 determines the smoothing filter SF1 (FIG. 15) at each pixel position. It would be possible to employ the various representative values mentioned in the embodiment illustrated in FIG. 17 (e.g. maximum value) as the representative value αf here. The element SLe is an element (level) of the smoothing level matrix SL.

The drawing depicts a first smoothing filter SFa of a first pixel PXa that borders the lower boundary line Bs, and a second smoothing filter SFb of a second pixel PXb in the center part of the pixel block. The element SLe that is used to determine the first smoothing filter SFa is "4." As a result, the value αfp is the same as the representative normalized strength αf, and so the magnitude of smoothing is stronger. Meanwhile, the element SLe that is used to determine the second smoothing filter SFb is "1." As a result, the value αfp is one-fourth of the representative normalized strength αf, and so the magnitude of smoothing is weaker.

In this way, in Embodiment 2, for pixels bordering boundary lines, a stronger smoothing process is executed as compared with pixels in the center of the pixel block, thus block noise produced in proximity to the boundary lines can be reduced while also blurring of the image in the center section of the pixel block can be suppressed. In Embodiment 2, the magnitude of smoothing varies over multiple steps, so that the magnitude of smoothing increases as the pixel position within the pixel block becomes closer to the boundary line. Consequently, it will be possible to suppress large stepwise changes in smoothing magnitude within pixel blocks. As a result, noise within the pixel blocks cause by large changes in magnitude can be suppressed.

The smoothing levels are not limited to those depicted in FIG. 20, and it would be possible to employ various levels. In general, it is preferable for the smoothing module 424 (FIG. 9) to set the smoothing magnitude to stronger level with decreasing distance from the boundary line of the pixel block.

As in the embodiment depicted in FIG. 18, the smoothing module 424 (FIG. 9) may determine smoothing magnitude for the color difference components U, V from the smoothing magnitude for the luminance component Y. Also, as in the embodiment depicted in FIGS. 19A and 19B, a smoothing filter of different format may be used for each individual color component.

Figure 21:
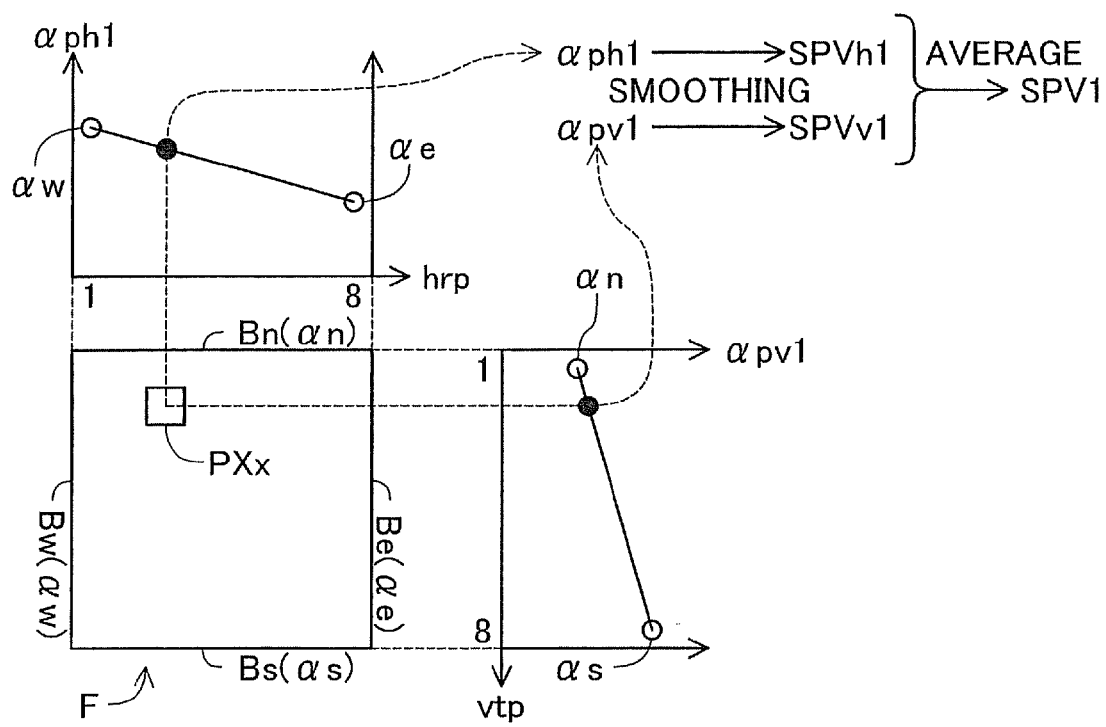
FIG. 21 is an illustration depicting an overview of yet another embodiment of the smoothing process.

B3. Embodiment 3 of Smoothing Process Utilizing Block Noise Strength:

FIG. 21 is an illustration depicting an overview of yet another embodiment of the smoothing process. The only difference from the embodiment depicted in FIG. 17 is that the normalized strength calculated through interpolation depending on pixel position within the pixel block is used in place of the representative normalized strength $\alpha f$. The device configuration and process steps are the same as in the embodiment illustrated in FIGS. 1A-1B, FIG. 2, FIG. 9, and FIG. 10.

FIG. 21 depicts an overview of the smoothing process of a given target pixel PXx. In this embodiment, the smoothing module 424 (FIG. 9) calculates a horizontal normalized strength $\alpha ph1$ through linear interpolation of the horizontal direction hr, and a vertical normalized strength $\alpha pv1$ through linear interpolation of the vertical direction vt.

The horizontal normalized strength $\alpha ph1$ is calculated from the left normalized strength $\alpha w$ of the left boundary line Bw, and the right normalized strength $\alpha e$ of the right boundary line Be. At the pixel position (hrp=1) bordering the left boundary line Bw, the horizontal normalized strength $\alpha ph1$ is set to the left normalized strength $\alpha w$. At the pixel position (hrp=8) bordering the right boundary line Be, the horizontal normalized strength $\alpha ph1$ is set to the right normalized strength $\alpha e$. At pixel positions therebetween (hrp=2-7), the horizontal normalized strength $\alpha ph1$ is determined through linear interpolation. As a result, the horizontal normalized strength $\alpha ph1$ becomes closer to the left normalized strength $\alpha w$, as the target pixel PXx is closer to the left boundary line Bw. Meanwhile, the horizontal normalized strength $\alpha ph1$ becomes closer to the right normalized strength $\alpha e$, as the target pixel PXx is closer to the right boundary line Be.

The vertical normalized strength $\alpha pv1$ is calculated from the upper normalized strength $\alpha n$ of the upper boundary line Bn, and the lower normalized strength $\alpha s$ of the lower boundary line Bs. At the pixel position (vtp=1) bordering the upper boundary line Bn, the vertical normalized strength $\alpha pv1$ is set to the upper normalized strength $\alpha n$. At the pixel position (vtp=8) bordering the lower boundary line Bs, the vertical normalized strength $\alpha pv1$ is set to the lower normalized strength $\alpha s$. At pixel positions therebetween (vtp=2-7), the vertical normalized strength $\alpha pv1$ is determined through linear interpolation. As a result, the vertical normalized strength $\alpha pv1$ will become closer to the upper normalized strength $\alpha n$, as the target pixel PXx is closer to the upper boundary line Bn. Meanwhile, the vertical normalized strength $\alpha pv1$ will become closer to the lower normalized strength $\alpha s$, as the target pixel PXx is closer to the lower boundary line Bs.

The smoothing module 424 (FIG. 9) determines the smoothing filter SF1 (FIG. 15) from the horizontal normalized strength $\alpha ph1$, and uses this smoothing filter SF1 to calculate a horizontal smoothed pixel value SPVh1. The smoothing module 424 then determines the smoothing filter SF1 from the vertical normalized strength $\alpha pv1$, and uses this smoothing filter SF1 to calculate a vertical smoothed pixel value SPVv1. The smoothing module 424 then employs the average value SPV1 of these smoothed pixel values SPVh1, SPVv1 as the final pixel value of the target pixel PXx.

The smoothing process of Embodiment 3 described above can be expressed another way, as follows. Specifically, in order to utilize the four normalized strengths $\alpha n$, $\alpha e$, $\alpha s$, $\alpha w$ in the smoothing process, the smoothing module 424 (FIG. 9) assigns to the four normalized strengths $\alpha n$, $\alpha e$, $\alpha s$, $\alpha w$ greater weights with decreasing distance from the target pixel PXx. As a result, a stronger smoothing process is carried out on pixels that are closer to boundary lines with large block noise strength BNS (normalized strength $\alpha$), so that block noise can be reduced. Meanwhile, for pixels that are further away from boundary lines with large block noise strength BNS, a strong smoothing process will be suppressed, thus reducing excessive blurring of the image.

As in the embodiment depicted in FIG. 18, the smoothing module 424 (FIG. 9) may determine smoothing magnitude for the color difference components U, V from the smoothing magnitude for the luminance component Y (normalized strength $\alpha ph1$, $\alpha pv1$). Also, as in the embodiment depicted in FIGS. 19A and 19B, a smoothing filter of different format may be used for each individual color component.

Figure 22:
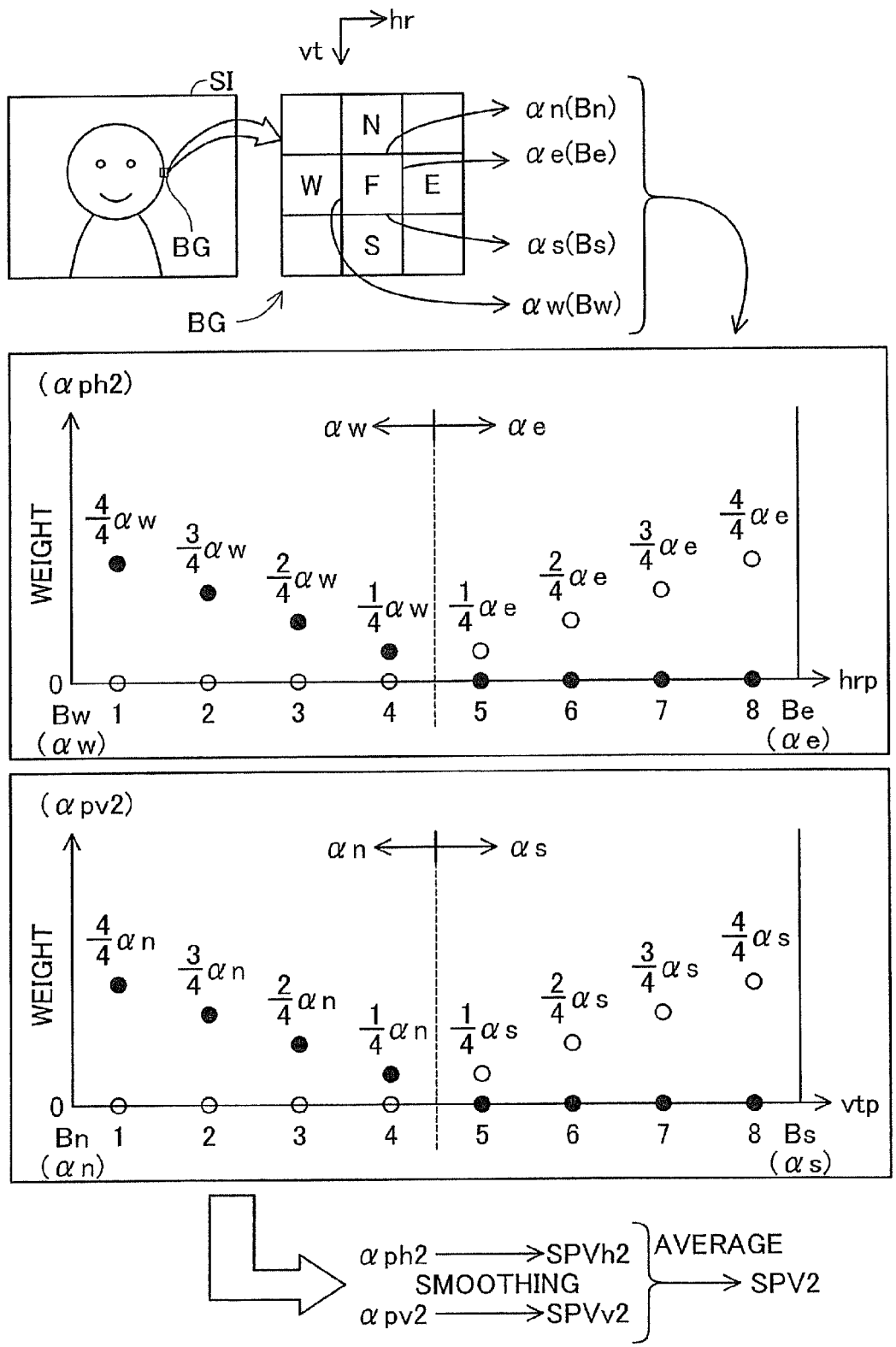
FIG. 22 is an illustration depicting an overview of yet another embodiment of the smoothing process.

B4. Embodiment 4 of Smoothing Process Utilizing Block Noise Strength:

FIG. 22 is an illustration depicting an overview of yet another embodiment of the smoothing process. The difference from the embodiment depicted in FIG. 17 is that, for the purpose of utilizing the normalized strengths $\alpha n$, $\alpha e$, $\alpha s$, $\alpha w$ in the smoothing process, weights dependent on pixel position within the pixel block are assigned to the normalized strengths $\alpha n$, $\alpha e$, $\alpha s$, $\alpha w$. The device configuration and process steps are the same as in the embodiment illustrated in FIGS. 1A-1B, FIG. 2, FIG. 9, and FIG. 10.

In this embodiment, the smoothing module 424 (FIG. 9) calculates a horizontal normalized strength $\alpha ph2$ and a vertical normalized strength $\alpha pv2$. The horizontal normalized strength $\alpha ph2$ is the weighted sum of the left normalized strength $\alpha w$ of the left boundary line Bw, and the right normalized strength $\alpha e$ of the right boundary line Be. The graph in the middle of FIG. 22 depicts the relationship of the weights assigned to the normalized strengths $\alpha w$ and $\alpha e$ (vertical axis), with horizontal pixel position hrp (horizontal axis). The black circles indicate weights assigned to the left normalized strength $\alpha w$, and the white circles indicate weights assigned to the right normalized strength $\alpha e$. The weight assigned to the left normalized strength $\alpha w$ becomes larger with decreasing distance from the left boundary line Bw, while the weight assigned to the right normalized strength $\alpha e$ becomes larger with decreasing distance from the right boundary line Be. Additionally, in the range in which the horizontal pixel position hrp is closer to the right boundary line Be than to the left boundary line Bw (from 5 to 8), the weight of the left normalized strength $\alpha w$ is set to zero. In the range in which the horizontal pixel position hrp is closer to the left boundary line Bw than to the right boundary line Be (from 1 to 4), the weight of the right normalized strength $\alpha e$ is set to zero. As a result, in the range in which the horizontal pixel position hrp is closer to the left boundary line Bw than to the right boundary line Be (from 1 to 4), a value equal to the left normalized strength $\alpha w$ multiplied by the weight is used as the horizontal normalized strength $\alpha ph2$. In the range in which the horizontal pixel position hrp is closer to the right boundary line Be than to the left boundary line Bw (from 5 to 8), a value equal to the right normalized strength $\alpha e$ multiplied by the weight is used as the horizontal normalized strength $\alpha ph2$.

The vertical normalized strength $\alpha pv2$ is the weighted sum of the upper normalized strength $\alpha n$ of the upper boundary line Bn, and the lower normalized strength $\alpha s$ of the lower boundary line Bs. The graph at bottom in FIG. 22 depicts the relationship of the weights assigned to the normalized strengths $\alpha n$ and $\alpha s$ (vertical axis), with vertical pixel position vtp (horizontal axis). The black circles indicate weights assigned to the upper normalized strength αn, and the white circles indicate weights assigned to the lower normalized strength αs. The weight assigned to the upper normalized strength αn becomes larger with decreasing distance from the upper boundary line Bn, while the weight assigned to the lower normalized strength αs becomes larger with decreasing distance from the lower boundary line Bs. Additionally, in the range in which the vertical pixel position vtp is closer to the lower boundary line Bs than to the upper boundary line Bn (from 5 to 8), the weight of the upper normalized strength αn is set to zero. In the range in which the vertical pixel position vtp is closer to the upper boundary line Bn than to the lower boundary line Bs (from 1 to 4), the weight of the lower normalized strength αs is set to zero. As a result, in the range in which the vertical pixel position vtp is closer to the upper boundary line Bn than to the lower boundary line Bs (from 1 to 4), a value equal to the upper normalized strength αw multiplied by the weight is used as the vertical normalized strength αpv2. In the range in which the vertical pixel position vtp is closer to the lower boundary line Bs than to the upper boundary line Bn (from 5 to 8), a value equal to the lower normalized strength αs multiplied by the weight is used as the horizontal normalized strength αpv2.

The smoothing module 424 (FIG. 9) determines the smoothing filter SF1 (FIG. 15) from the horizontal normalized strength αph2, and uses this smoothing filter SF1 to calculate a horizontal smoothed pixel value SPVh2. The smoothing module 424 then determines the smoothing filter SF1 from the vertical normalized strength αpv2, and uses this smoothing filter SF1 to calculate a vertical smoothed pixel value SPVv2. The smoothing module 424 then employs the average value SPV2 of these smoothed pixel values SPVh2, SPVv2 as the final pixel value.

As described above, in Embodiment 4, for the purpose of utilizing the normalized strengths αn, αe, αs, αw in the smoothing process, the smoothing module 424 (FIG. 9) assigns to the four normalized strengths αn, αe, αs, αw larger weights with decreasing distance from the target pixel. As a result, for pixels close to a boundary line of high block noise strength BNS (normalized strength α), a strong smoothing process is carried out so that block noise can be reduced. For pixels that are close to boundary lines with low block noise strength BNS, a weak smoothing process is carried out so as to suppress excessive blurring of the image.

In the embodiment depicted in FIG. 22, pixels bordering the boundary lines undergo a stronger smoothing process as compared with pixels at the center of the pixel block, and thus block noise occurred in proximity to the boundary lines can be reduced and blurring of the image in the center section of the pixel block can be suppressed.

Moreover, in FIG. 22, both when the horizontal pixel position hrp is "1" and when it is "8" the weight is the same, namely "4/4." Meanwhile, the left normalized strength αw may differ from the right normalized strength αe. Accordingly, the actual magnitude of smoothing may differ between instances where the horizontal pixel position hrp is "1" and where it is "8." This is true analogously for the vertical direction as well. Thus, in this embodiment, even where the distance to the nearest boundary line is the same, the actual magnitude of smoothing may differ by individual nearest boundary line. In other words, within a group of pixels for which the nearest boundary line is the same, the magnitude of smoothing will become stronger as the pixel is closer to the boundary line.

As in the embodiment depicted in FIG. 18, the smoothing module 424 (FIG. 9) may determine smoothing magnitude for the color difference components U, V from the smoothing magnitude for the luminance component Y (normalized strength αph2, αpv2). Also, as in the embodiment depicted in FIGS. 19A and 19B, a smoothing filter of different format may be used for each individual color component.

Figure 23:
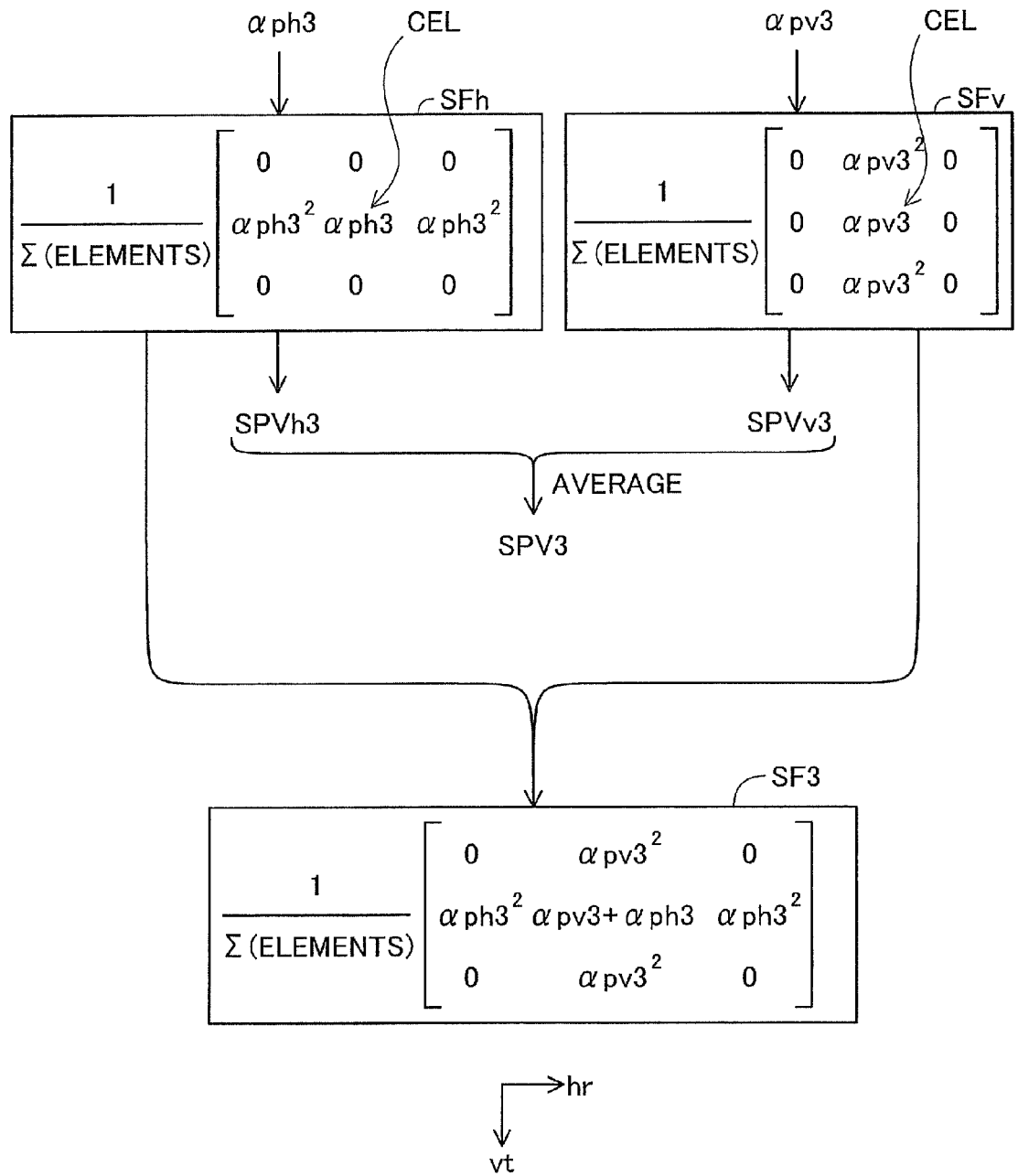
FIG. 23 is an illustration depicting an overview of yet another embodiment of the smoothing process.

B5. Embodiment 5 of Smoothing Process Utilizing Block Noise Strength:

FIG. 23 is an illustration depicting an overview of yet another embodiment of the smoothing process. The difference from the respective embodiments described above is that anisotropic smoothing filters are used. FIG. 23 depicts a horizontal smoothing filter SFh and a vertical smoothing filter SFv. The device configuration and process steps are the same as in the embodiment illustrated in FIGS. 1A-1B, FIG. 2, FIG. 9, and FIG. 10.

The horizontal smoothing filter SFh preserves the center element CEL and the left and the right elements of the center element CEL in the smoothing filter SF1 depicted in FIG. 15, but sets the remaining elements to zero. By using this horizontal smoothing filter SFh, variation in pixel values can be reduced when pixels are traced along the horizontal direction hr (hereinbelow, termed "smoothing along the horizontal direction hr" or "horizontal smoothing").

To determine the elements of the horizontal smoothing filter SFh, a horizontal normalized strength αph3 is used in place of the normalized strength α described in FIG. 15. In this embodiment, the average of the left normalized strength αw and the right normalized strength αe is used as the horizontal normalized strength αph3 (these normalized strengths αw, αe represent strength at the vertical boundary lines Bw, Be, respectively (FIG. 20)). This horizontal normalized strength αph3 is utilized in common for all of the pixels within a single pixel block.

The vertical smoothing filter SFv preserves the center element CEL and the elements above and below the center element CEL in the smoothing filter SF1 depicted in FIG. 15, but sets the remaining elements to zero. By using this vertical smoothing filter SFv, variation in pixel values can be reduced when pixels are traced along the vertical direction vt (hereinbelow, termed "smoothing along the vertical direction vt" or "vertical smoothing").

To determine the elements of the vertical smoothing filter SFv, a vertical normalized strength αpv3 is used in place of the normalized strength α described in FIG. 15. In this embodiment, the average of the upper normalized strength αn and the lower normalized strength αs is utilized as the vertical normalized strength αpv3 (these normalized strengths αn, αs represent strength at the horizontal boundary lines Bn, Bs respectively (FIG. 20)). This vertical normalized strength αpv3 is utilized in common for all of the pixels within a single pixel block.

The smoothing module 424 (FIG. 9) calculates the horizontal normalized strength αph3 and the vertical normalized strength αpv3. The smoothing module 424 then utilizes the horizontal smoothing filter SFh to calculate a horizontal smoothed pixel value SPVh3, utilizes the vertical smoothing filter SFv to calculate a vertical smoothed pixel value SPVv3, and employs the average SPV3 of these smoothed pixel values SPVh3, SPVv3 as the final pixel value of the target pixel.

The smoothing filter SF3 shown at bottom in FIG. 23 represents an integrated single filter of the two smoothing filters SFh, SFv. As illustrated, the elements of the filter SF3 are asymmetric between the horizontal direction hr and the vertical direction vt. Thus, in this embodiment, the smoothing module 424 (FIG. 9) carries out an anisotropic smoothing processes of differing magnitude in the horizontal direction hr versus in the vertical direction vt. As a result, in the case of strong block noise indicative of pixel value variation in one direction, it will be possible to prevent the strong block noise from causing excessively strong magnitude of smoothing in the direction orthogonal to the direction of the noise.

In this embodiment in particular, the magnitude of horizontal smoothing will become greater as the horizontal normalized strength $\alpha ph3$ is larger. As a result, the magnitude of horizontal smoothing can be adjusted appropriately depending on block noise which is indicative of pixel value variation in the horizontal direction hr. Similarly, the magnitude of vertical smoothing will become greater as the vertical normalized strength $\alpha pv3$ is larger. As a result, the magnitude of vertical smoothing can be adjusted appropriately depending on block noise which is indicative of pixel value variation in the vertical direction vt.

As the horizontal normalized strength $\alpha ph3$ it would be possible to employ various values that represent magnitude of variation of pixel values when pixels are traced along the horizontal direction hr (i.e. strength of block noise extending along the vertical direction vt). For example, the horizontal normalized strength $\alpha ph1$ of FIG. 21 or the horizontal normalized strength $\alpha ph2$ of FIG. 22 could be employed without further modification. In this case, the horizontal normalized strength $\alpha ph3$ will be able to vary according to pixel position within the pixel block. In general, it will be preferable for the horizontal normalized strength $\alpha ph3$ to be determined using at least either one among the normalized strengths $\alpha w$, $\alpha e$ of the vertical boundary lines Bw, Be. By so doing, a smoothing process appropriate to the direction in which strong block noise extends will be carried out, so that problems such as blurring of the image can be suppressed and block noise can be reduced.

Similarly, as the vertical normalized strength $\alpha pv3$ it would be possible to employ various values that represent magnitude of variation of pixel values when pixels are traced along the vertical direction vt (i.e. strength of block noise extending along the horizontal direction hr). For example, the vertical normalized strength $\alpha pv1$ of FIG. 21 or the vertical normalized strength $\alpha pv2$ of FIG. 22 could be employed without further modification. In this case, the vertical normalized strength $\alpha pv3$ will be able to vary according to pixel position within the pixel block. In general, it will be preferable for the vertical normalized strength $\alpha pv3$ to be determined using at least either one among the normalized strengths $\alpha w$, $\alpha e$ of the horizontal boundary lines Bn, Bs.

As in the embodiment depicted in FIG. 18, the smoothing module 424 (FIG. 9) may determine smoothing magnitude for the color difference components U, V from the smoothing magnitude for the luminance component Y (normalized strength $\alpha ph3$, $\alpha pv3$). Also, as in the embodiment depicted in FIGS. 19A and 19B, a smoothing filter of different format may be used for each individual color component.

B6. Embodiment 6 of Smoothing Process Utilizing Block Noise Strength:

FIG. 24 is an illustration depicting an overview of yet another embodiment of the smoothing process. In this embodiment, the smoothing module 424 (FIG. 9) utilizes the weighted average SPV4 of a horizontal smoothed pixel value SPVh4 and a vertical smoothed pixel value SPVv4 as the final smoothed pixel value. The device configuration and process steps are the same as in the embodiment illustrated in FIGS. 1A-1B, FIG. 2, FIG. 9, and FIG. 10.

The horizontal smoothed pixel value SPVh3 shown in FIG. 23 is utilized as the horizontal smoothed pixel value SPVh4. This horizontal smoothed pixel value SPVh4 (SPVh3) is a smoothed pixel value that has been calculated through horizontal smoothing. The vertical smoothed pixel value SPVv3 shown in FIG. 23 is utilized as the vertical smoothed pixel value SPVv4. This vertical smoothed pixel value SPVv4 (SPVv3) is a smoothed pixel value that has been calculated through vertical smoothing.

A horizontal-weight matrix HW is depicted in FIG. 24. This 8*8 matrix HW indicates a weight for the horizontal smoothed pixel value SPVh4, at each pixel position in the pixel block (also termed the "horizontal weight HWe"). The weight of the vertical smoothed pixel value SPVv4 is set to "1−horizontal weight HWe" (also termed the "vertical weight").

For a plurality of pixels HP for which the nearest boundary line is the vertical boundary line Bw or Be, the horizontal weight HWe is greater than the vertical weight. The horizontal weight HWe becomes larger with decreasing distance from the center of the vertical boundary line Bw, Be. As shown at bottom in FIG. 24, the averages SPV4 for these pixels HP are determined primarily by the horizontal smoothed pixel value SPVh4.

Conversely, for a plurality of pixels VP for which the nearest boundary line is the horizontal boundary line Bn or Bs, the vertical weight is greater than the horizontal weight HWe. The vertical weight becomes larger (the horizontal weight HWe becomes smaller) with decreasing distance from the center of the horizontal boundary line Bn, Bs. As shown at bottom in FIG. 24, the averages SPV4 for these pixels VP are determined primarily by the vertical smoothed pixel value SPVv4.

For pixels situated at equal distances from a horizontal boundary line Bn or Bs and from a vertical boundary line Bw or Be, the vertical weight and the horizontal weight HWe have the same values of "0.5." For the four pixels at the center of the pixel block as well, the vertical weight and the horizontal weight HWe have the same values of "0.5."

FIG. 25 is an illustration depicting a smoothing filter. This smoothing filter SF4 is a smoothing filter obtained by combining the horizontal-weight matrix HW described above, and the smoothed pixel values SPVh3, SPVv3 (smoothing filters SFh, SFv) shown in FIG. 23. The respective utilization of the smoothed pixel values SPVh3, SPVv3 shown in FIG. 23 as the smoothed pixel values SPVh4, SPVv4 shown in FIG. 24 is equivalent to calculating the smoothed pixel values using this smoothing filter SF4.

As illustrated, the elements of the filter SF4 are asymmetric between the horizontal direction hr and the vertical direction vt. In particular, in relation to pixels close to the vertical boundary lines Bw, Be, the magnitude of horizontal smoothing is stronger due to the large horizontal weight HWe. In the vicinity of such vertical boundary lines Bw, Be, pixel value variation in the horizontal direction hr (block noise extending in the vertical direction vt) will tend to occur easily. As a result, it will be possible to reduce the block noise through strong horizontal smoothing. Blurring of the image can then be suppressed by weakening the magnitude of smoothing in the vertical direction vt parallel to the boundary lines Bw, Be.

On the other hand, for pixels close to the horizontal boundary lines Bn, Bs, vertical smoothing is stronger due to the small horizontal weight HWe. In the vicinity of such horizontal boundary lines Bn, Bs, pixel value variation in the vertical direction vt (block noise extending in the horizontal direction hr) will tend to occur easily. As a result, it will be possible to reduce the block noise through strong vertical smoothing. Blurring of the image can then be suppressed by weakening the magnitude of smoothing in the horizontal direction hr parallel to the boundary lines Bn, Bs.

As the horizontal smoothed pixel value SPVh4, it would be possible to employ a pixel value calculated through various smoothing techniques utilizing the block noise strength BNS of at least either one among the two boundary lines Bw, Be that extend in the vertical direction vt. Similarly, as the vertical smoothed pixel value SPVv4, it would be possible to employ a pixel value calculated through various smoothing techniques utilizing the block noise strength BNS of at least either one among the two boundary lines Bn, Bs that extend in the horizontal direction hr. For example, it would be acceptable to utilize the smoothed pixel values SPVh1, SPVv1 shown in FIG. 21 or the smoothed pixel values SPVh2, SPVv2 shown in FIG. 22 as the smoothed pixel values SPVh4, SPVv4 of this embodiment.

In these instances as well, the horizontal weight HWe and the vertical weight (1−HWe) respectively indicate weights for determining magnitude of smoothing. Specifically, the horizontal weight HWe indicates a weight of the horizontal normalized strengths αph1, αph2 that are utilized to determine the horizontal smoothed pixel value SPVh4 (SPVh1, SPVh2). The vertical weight (1−HWe) indicates a weight of the vertical normalized strengths αpv1, αpv2 that are utilized to determine the vertical smoothed pixel value SPVv4 (SPVv1, SPVv2). That is, in the vicinity of the vertical boundary lines Bw, Be, the horizontal normalized strengths αph1, αph2 will be assigned larger weights than are the vertical normalized strengths αpv1, αpv2 when determining the magnitude of smoothing. As a result, it will be possible to effectively reduce block noise indicative of pixel value variation in the horizontal direction hr, which tends to occur easily in the vicinity of the vertical boundary lines Bw, Be. Then, by assigning small weights to the vertical normalized strengths αpv1, αpv2, excessive blurring of the image can be suppressed.

Conversely, in relation to the vicinity of the horizontal boundary lines Bn, Bs, by assigning large weights to the vertical normalized strengths αpv1, αpv2, it will be possible to effectively reduce block noise indicative of pixel value variation in the vertical direction vt, which tends to occur easily in the vicinity of the horizontal boundary lines Bn, Bs. Then, by assigning small weights to the horizontal normalized strengths αph1, αph2, excessive blurring of the image can be suppressed.

As in the embodiment depicted in FIG. 18, the smoothing module 424 (FIG. 9) may determine smoothing magnitude for the color difference components U, V from the smoothing magnitude for the luminance component Y. The smoothing module 424 may calculate a weighted average of horizontal smoothed pixel values and vertical smoothed pixel values, for each individual color component. An anisotropic smoothing filter of different format may be used for each individual color component.

Figure 26:
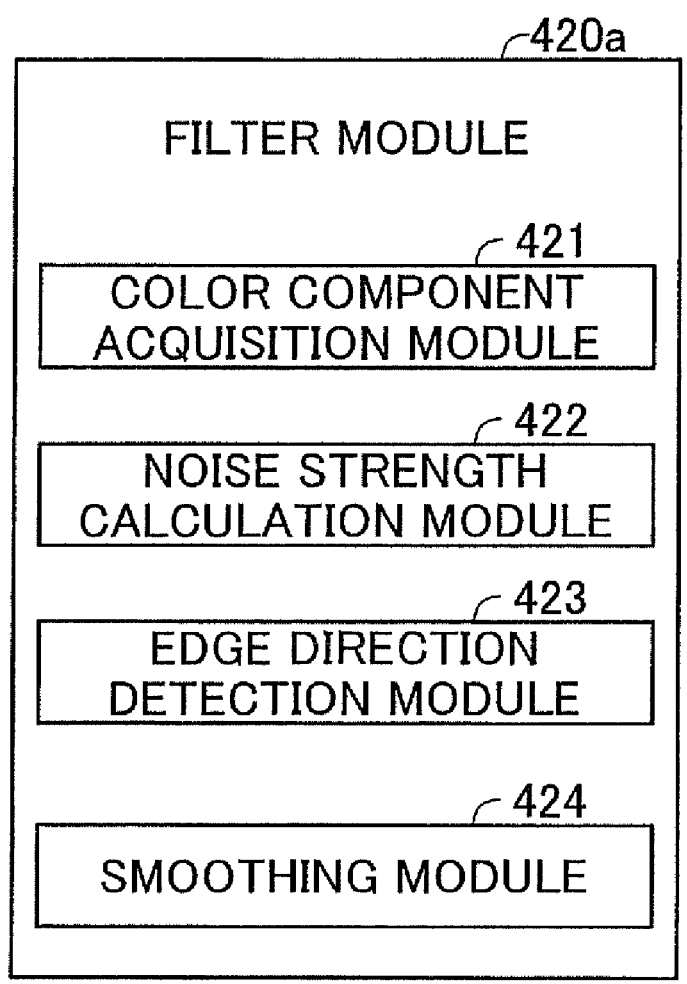
FIG. 26 is an illustration depicting a filter module 420*a*.

B7. Embodiment 7 of Smoothing Process Utilizing Block Noise Strength:

FIG. 26 is an illustration depicting a filter module 420a in Embodiment 7. The only difference from the filter module 420b depicted in FIG. 9 is that an edge direction detection module 423 is additionally provided. The other parts of the device configuration are the same as in the embodiment depicted in FIG. 1A-1B and FIG. 2. Image processing is carried out analogously to the embodiment depicted in FIGS. 4, 5, and 10. However, in this embodiment, in Step S210 of FIG. 10 the edge direction detection module 423 detects the edge direction of the image represented by the pixel block. Then, using the detected edge direction, the smoothing module 424 carries out the smoothing process.

Figure 27:
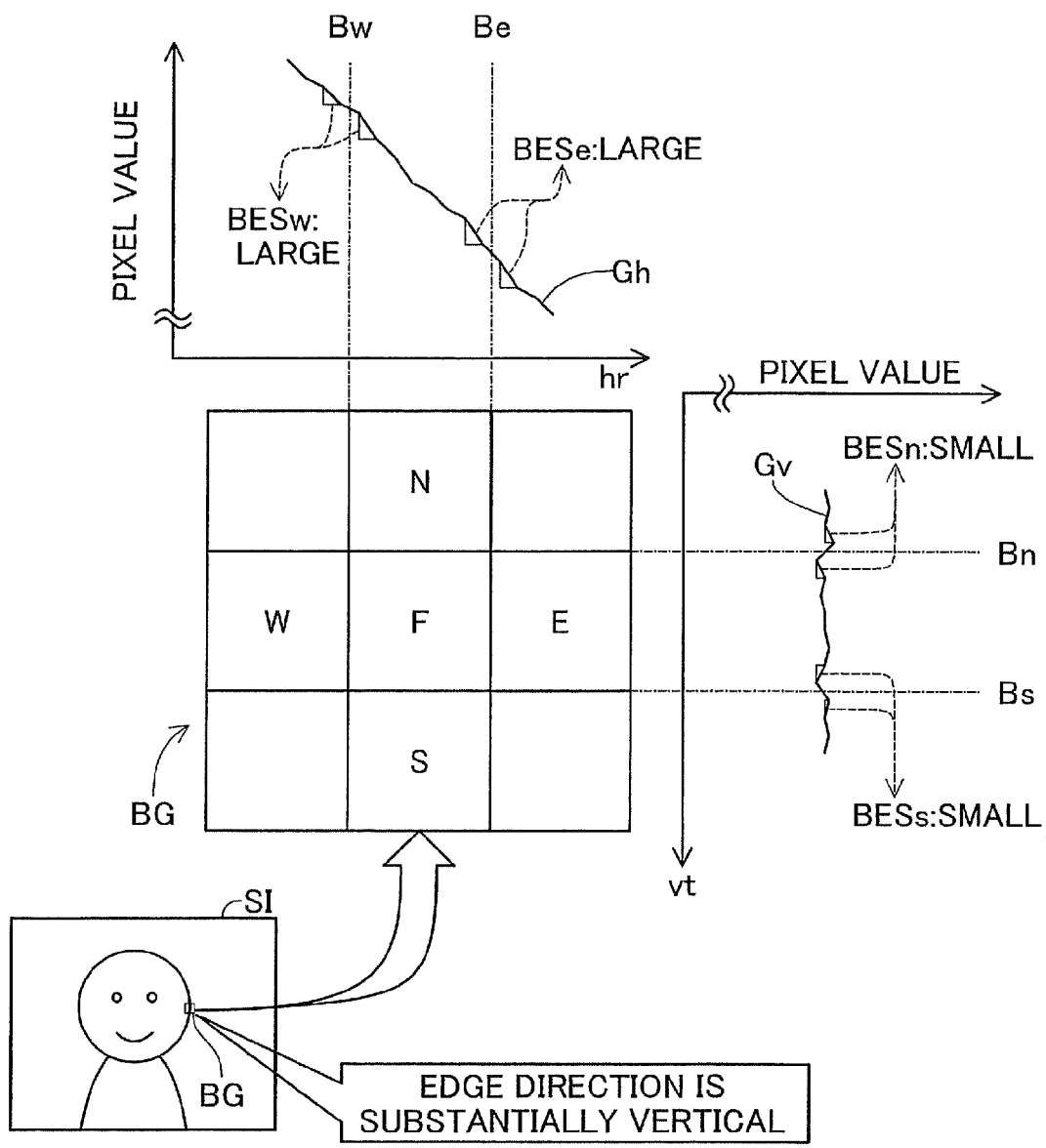
FIG. 27 is an illustration depicting a relationship between edge direction and edge strength BES.

FIG. 27 is an illustration depicting a relationship between an edge direction and the edge strength BES. In FIG. 27, as in FIG. 11, there are depicted the target image SI, and the group BG of 3*3 pixel blocks centered on the target block F. A first graph Gh comparable to that in FIG. 13 is shown above the pixel block group BG. The horizontal axis gives pixel position in the horizontal direction, while the vertical axis gives the pixel value. A second graph Gv is shown to the right of the pixel block group BG. This second graph Gv depicts a relationship between pixel position in the vertical direction vt (vertical axis) and pixel value (horizontal axis).

In the example of FIG. 27, the pixel block group BG represents an edge of the subject of the target image SI. This edge extends substantially in the vertical direction vt. This means that in the pixel block group BG taken as a whole (and particularly in the target block F and proximity to the target block F), variation in pixel values will be large when pixels are traced in the horizontal direction hr, while variation in pixel values will be small when pixels are traced in the vertical direction vt (see graphs Gh, Gv). As a result, edge strength BESw at the left boundary line Bw and edge strength BESe at the right boundary line Be will be large (hereinafter, these edge strengths BESw, BESe will be respectively termed "vertical edge strength BESw, BESe"). Edge strength BESn at the upper boundary line Bn and edge strength BESs at the lower boundary line Bs will be small (hereinafter, these edge strengths BESn, BESs will be respectively termed "horizontal edge strength BESn, BESs").

Conversely, where the pixel block group BG represents an edge extending in the horizontal direction hr, the horizontal edge strength BESn, BESs will be large and the vertical edge strength BESw, BESe will be small (not illustrated).

In general, as decreasing angle defined by the edge direction and a boundary line, the edge strength BES related to that boundary line will become greater. Accordingly, edge direction can be represented in terms of a ratio of the vertical edge strength BESw, BESe to the horizontal edge strength BESn, BESs.

FIG. 28 is a schematic diagram depicting calculation of edge direction. For pixels within a first triangular area AA1 situated in the upper left half of the target block F, the edge direction detection module 423 (FIG. 26) first calculates a slope angle DA1 from the upper horizontal edge strength BESn and the left vertical edge strength BESw (DA1=arctan (BESw/BESn).

This first slope angle DA1 indicates the angle defined by the edge direction and the horizontal direction hr. Two edge directions EGa, EGb are shown at bottom in FIG. 28. The first edge direction EGa indicates an edge direction extending towards upper right. The second edge direction EGb indicates an edge direction extending towards lower right. The angle Ax defined by the edge direction and the horizontal direction hr is the same for each of the two edge directions EGa, EGb. Upper right indicates a range from 0 to 90 degrees for an angle rotated counterclockwise from the horizontal direction hr (hereinafter termed "base angle θ"). Lower right indicates a range from −90 to 0 degrees for the base angle θ.

Where the first triangular area AA1 represents an edge that extends in the first edge direction EGa, the first slope angle DA1 is the angle Ax. Also, where the first triangular area AA1 represents an edge that extends in the second edge direction EGb, the first slope angle DA1 will be the angle Ax as well. In this way, a single value of the first slope angle DA1 may indicate both an instance in which the edge direction points to upper right, and an instance in which the edge direction points to lower right. The reason is that, as shown by Numeric Expression 3, the edge strengths BESn, BESw are each set to a value of zero or above. Here, the first slope angle DA1 is set to a value within the range from 0 to 90 degrees based on the horizontal direction hr.

Consequently, the edge direction detection module 423 (FIG. 26) executes a process to identify the edge direction in more detail. Specifically, upper right and lower right are distinguished by a comparison result of a magnitude of a pixel value variation rate on a first line Ln1 and a magnitude of a pixel value variation rate on a third line Ln3, within the first triangular area AA1.

The first line Ln1 indicates a line (f11, f22, f33, f44) extending from the pixel (f11) at the upper left corner of the target block F towards the lower right (θ=−45 degrees) to the pixel in the center (f44). A magnitude VR1 of a pixel value variation rate on this first line Ln1 can be calculated by various methods. For example, the following computational expression could be employed.

$$VR1=(|f22-f11|+|f33-f22|+|f44-f33|)/3$$

This magnitude VR1 indicates the average of the absolute values of pixel value differences between neighboring pixels on the first line Ln1.

The third line Ln3 indicates a line (f81, f72, f63, ... f27, f18) extending from the pixel (f81) at the lower left corner of the target block F towards the upper right (θ=45 degrees) to the pixel (f18) at the upper right corner. A magnitude VR3 of a pixel value variation rate on this third line Ln3 may be calculated by various methods. For example, the following computational expression could be employed.

$$VR3=(|f72-f81|+|f63-f72|+|f54-f63|+|f45-f54|+|f36-f45|+|f27-f36|+|f18-f27|)/7$$

This magnitude VR3 indicates the average of the absolute values of pixel value differences between neighboring pixels on the third line Ln3.

If the edge direction is going towards the upper right like the first edge direction EGa, the first magnitude VR1 is greater than the third magnitude VR3. On the other hand, if the edge direction is going towards the lower right like the second edge direction EGb, the first magnitude VR1 is less than the third magnitude VR3. Accordingly, if the first magnitude VR1 is equal to or greater than the third magnitude VR3, the edge direction detection module 423 (FIG. 26) employs the first slope angle DA1 without further modification as the first edge angle EA1. If the first magnitude VR1 is less than the third magnitude VR3, a value obtained by setting the sign of the first slope angle DA1 to negative (−) is employed as the first edge angle EA1. This first edge angle EA1 which indicates the edge direction is represented by an angle rotated counterclockwise from the horizontal direction hr (from −90 to +90 degrees).

For pixels within a second triangular area AA2 situated in the lower right half of the target block F, the edge direction detection module 423 (FIG. 26) calculates a second slope angle DA2 from the lower horizontal edge strength BESs and the right vertical edge strength BESe, and then calculates a second edge angle EA2 from the second slope angle DA2. This second edge angle EA2 which indicates the edge direction is represented by an angle rotated counterclockwise from the horizontal direction hr (from −90 to +90 degrees). For pixels on the boundary of the two areas AA1, AA2, it will be possible to use either one of the two edge angles EA1, EA2. The method of calculating the second edge angle EA2 is similar to the method of calculating the first edge angle EA1. Here, the second line Ln2 is used in place of the first line Ln1. The second line Ln2 indicates a line (f88, f77, f66, f55) extending from the pixel (f88) at the lower right corner of the target block F towards the upper left right (θ=135 degrees) to the pixel in the center (f55).

Figure 29:
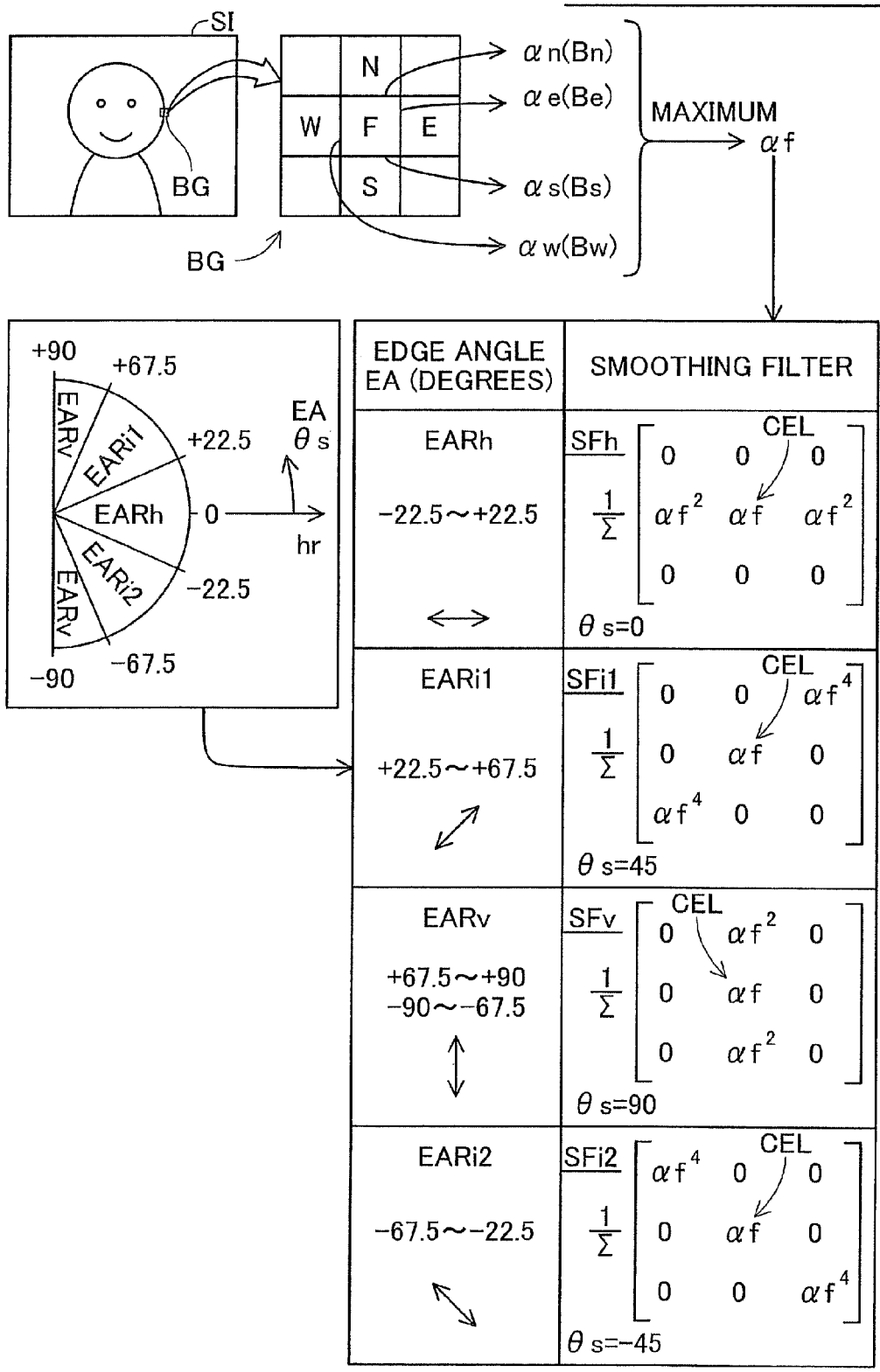
FIG. 29 is a schematic diagram depicting a smoothing process utilizing edge direction.

FIG. 29 is a schematic diagram depicting a smoothing process utilizing the edge direction. In this embodiment, the edge direction detection module 423 (FIG. 26) selects a smoothing filter depending on the edge angle EA, from among four types of anisotropic smoothing filters SFh, SFi1, SFv, and SFi2 having mutually different smoothing directions.

Here, the direction of smoothing refers to the direction in which the magnitude of smoothing is strongest, i.e. the direction in which it is possible to most strongly smooth out the pixel value variation rate. Such a smoothing direction can be ascertained by using test image data as follows, for example. Assuming for example that the pixel value of a given particular pixel within the test image is set to a peak value, and that the pixel values of the other pixels are set to smaller values with increasing distance from the particular pixel. In this case, the shape of the pixel value distribution within the test image is an isotropic mountain shape, with the particular pixel at the peak. Smoothing processes using the same smoothing filter are carried out on the entire test image. As a result, differences in pixel value between the particular pixel and neighboring pixels reduce. An amount of reduction of pixel value difference corresponds to the magnitude of smoothing (the smoothing magnitude becomes greater as the amount of reduction becomes greater). Here, the amounts of reduction of pixel value differences are compared on an individual basis for neighboring pixels. As the neighboring pixels it would be possible to select the eight pixels surrounding the particular pixel, for example. Here, the direction from the particular pixel towards a neighboring pixel corresponding to the largest amount of reduction of pixel value difference can be designated as the smoothing direction. Hereinbelow, the smoothing direction will be represented by an angle θs rotated counterclockwise from the horizontal direction hr. Strong magnitude of smoothing in a particular direction is equivalent to strong magnitude of smoothing in the opposite direction from that direction. Accordingly, the smoothing direction θs is represented by a value within the range from −90 to +90 degrees.

FIG. 29 shows a table representing relationships between ranges of the edge angle EA and smoothing filters. Where the edge angle EA lies within a horizontal range EARh (from −22.5 to +22.5 degrees), the horizontal smoothing filter SFh is selected. This horizontal smoothing filter SFh is identical to the horizontal smoothing filter SFh depicted in FIG. 23. The smoothing direction θs of this smoothing filter SFh is 0 degrees.

Where the edge angle EA lies within a first slope range EARi1 (from +22.5 to +67.5 degrees), a first slope smoothing filter SFi1 is selected. This first slope smoothing filter SFi1 preserves the center element CEL and the upper right and the lower left elements of the center element CEL in the smoothing filter SF1 depicted in FIG. 15, but sets the remaining elements to zero. Where this first slope smoothing filter SFi1 is used, variation in pixel values can be reduced when pixels are traced from the upper right towards the lower left. The smoothing direction θs of this smoothing filter SFi1 is 45 degrees.

Where the edge angle EA lies within a vertical range EARv (from +67.5 to +90 degrees, or from −90 to −67.5 degrees), the vertical smoothing filter SFv is selected. This vertical smoothing filter SFv is identical to the vertical smoothing filter SFv depicted in FIG. 23. The smoothing direction θs of this smoothing filter SFh is 90 degrees.

Where the edge angle EA lies within a second slope range RARi2 (from −67.5 to −22.5 degrees), a second slope smoothing filter SFi2 is selected. This second slope smoothing filter SFi2 preserves the center element CEL and the upper left and the lower right elements of the center element CEL in the smoothing filter SF1 depicted in FIG. 15, but sets the remaining elements to zero. Where this second slope smoothing filter SFi2 is used, variation in pixel values can be reduced when pixels are traced from the upper left towards the lower right. The smoothing direction θs of this smoothing filter SFi2 is −45 degrees.

The smoothing module 424 (FIG. 26) determines the elements of each smoothing filter on the basis of a representative normalized strength αf. It would be possible to employ the various representative values mentioned in the embodiment depicted in FIG. 17 (e.g. the maximum value) as the representative normalized strength αf.

In this embodiment, if the slope angle DA1, DA2 (FIG. 28) lies within the range of either from 0 to +22.5 degrees or from +67.5 to +90 degrees, the common smoothing filter is used, both in instances where the edge direction points to the upper right and in instances where the edge direction points to the lower right. Consequently, in this instance, the process to distinguish between upper right and lower right may be omitted.

In the embodiment discussed above, a smoothing filter that smoothes pixel value variation in a direction substantially parallel to the edge direction is selected according to the edge angle EA (the edge angles EA1, EA2 in FIG. 28). That is, the magnitude of smoothing in the edge direction is stronger than the magnitude of smoothing in the direction orthogonal to the edge direction. As a result, it will be possible to suppress excessive smoothness of the edges of the subject. Block noise can be reduced as well.

Like the noise strength calculation module 422, the edge direction detection module 423 may use the luminance component Y to calculate edge direction. The smoothing module 424 may then use a single filter in common for each of the color components Y, U, V, here that single filter has been selected from among the four filters SFh, SFi1, SFv, and SFi2 according to edge direction. As in the embodiment depicted in FIG. 18, the smoothing module 424 (FIG. 26) may determine smoothing magnitude for the color difference components U, V from the smoothing magnitude for the luminance component Y. A smoothing filter of different format may be used for each individual color component.

Figure 30:
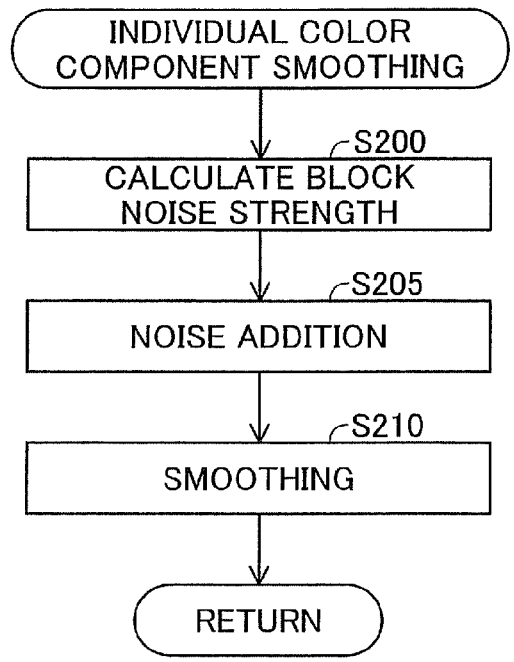
FIG. 30 is a flowchart depicting a procedure of a smoothing process for individual color components.

B8. Embodiment 8 of Smoothing Process Utilizing Block Noise Strength:

FIG. 30 is a flowchart depicting a procedure of a smoothing process for individual color components in Embodiment 8. The only difference from the process illustrated in FIG. 10 is that there is an additional Step S205 for adding noise, coming between the two steps S200 and S210. The processes described in the preceding respective embodiments may be employed as the processes of the two steps S200 and S210.

In this embodiment, the smoothing module 424 (FIG. 9, FIG. 26) adds noise to the pixel values, and then carries out the smoothing process using image data having undergone the noise addition. This is done in order to ameliorate those discontinuities in pixel values along boundary lines which is difficult to eliminate in smoothing processes that use smoothing filters.

Figure 31:
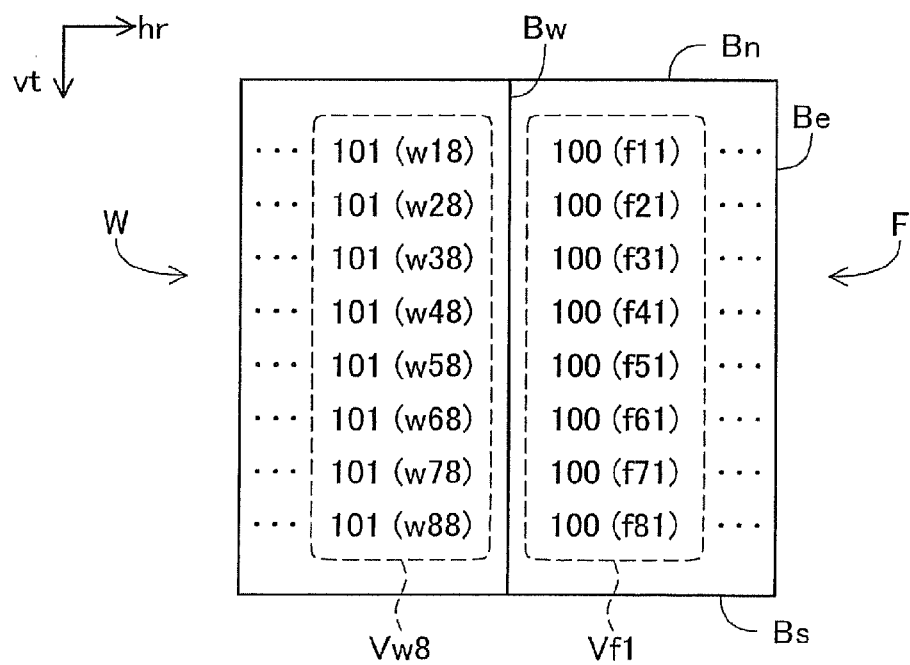
FIG. 31 is a schematic diagram depicting discontinuity on a boundary line.

FIG. 31 is a schematic diagram depicting discontinuity on a boundary line. In the drawing, a discontinuity is shown at the left boundary line Bw. All eight pixels f11 to f81 of the first pixel column Vf1 are "100," and all eight pixels w18 to w88 of the eighth pixel column Vw8 are "101." Thus, the variation rate of pixel values along the entire left boundary line Bw is the minimum value (1). In this case, since smoothed pixel values cannot be set to an intermediate value (e.g. 100.5), it will be difficult to eliminate discontinuities during the smoothing processes using a smoothing filter. Such discontinuities tend to stand out as "streaky" noise. Consequently, in this embodiment, noise is added to pixel values in order to eliminate such discontinuities. Such a pixel value distribution can occur, for example, where the pixel blocks F, W represent a smooth gradation.

FIG. 32 is a schematic diagram depicting noise addition. First, the smoothing module 424 (FIG. 9, FIG. 26) calculates a difference index value $\Delta i$ of the i-th row of the target block F. This difference index value $\Delta i$ represents the difference in pixel values between the target block F and the left block W, for the i-th row. Specifically, the difference obtained by subtracting the average value fi_ave of the eight pixel values fi1 to fi8 of the i-th row of the target block F from the pixel value wi8 of eighth column of the i-th row of the left block W is used as the difference index value $\Delta i$.

Next, the smoothing module 424 multiplies the difference index value $\Delta i$ by a coefficient nc determined with reference to the horizontal pixel position hrp, to calculate a noise characteristic value $\Delta ij$. As shown in the graph at middle in FIG. 32, this coefficient nc becomes larger as the horizontal pixel position hrp is closer to the left boundary line Bw. In the embodiment of FIG. 32, the coefficients nc are set to "3/4," "2/4," "1/4," and "0" respectively, for the four horizontal pixel positions hrp (1 to 4) closest to the left boundary line Bw. For horizontal pixel positions hrp in the range greater than 5 (5 to 8), the coefficient nc is set to "0."

Next, the smoothing module 424 determines a noise parameter from the noise characteristic value $\Delta ij$. In this embodiment, random numbers according to the normal distribution are utilized as the noise. The average value is set to "$\Delta ij/2$" and the variance is set to "$(\Delta ij/4)^2$." In this way, the magnitude of the noise will increase as the noise characteristic value $\Delta ij$ (i.e. difference index value $\Delta i$) becomes larger. It is possible to generate such noise, for example, with a computational expression "$(\Delta ij/2)+(\Delta ij/4)*Rn$" using a random number Rn according to the normal distribution that has the average of zero and the variance of 1.

The smoothing module 424 then adds random noise generated in the above manner to the eight pixel values fi1 to fi8 of the i-th row of the target block F (note that the noise addition is not performed for the five pixel values fi4 to fi8 whose average and variance have both been set to zero). An overview of variation in pixel values observed with the addition of noise is depicted at bottom in FIG. 32. In this diagram, five pixel values wi8 and fi1 to fi4 are depicted. The black circles indicate pixel values prior to the noise addition. The white circles indicate average pixel values after the noise addition. The ranges indicated by arrows show deviation in pixel values after the noise addition. In order to simplify the explanation, the pixel values fi1 to fi4 of the target block F are all assumed to be equal to the average value fi_ave.

As illustrated, with decreasing distance from the left boundary line Bw, the pixel value of the target block F is more likely to approach the pixel value wi8 of the left block W. Variation in pixel values becomes smaller with increasing distance from the left boundary line Bw. Thus, the discontinuity on the left boundary line Bw can be eliminated, while suppressing excessive variation in pixel values in the center section of the target block.

Figure 33:
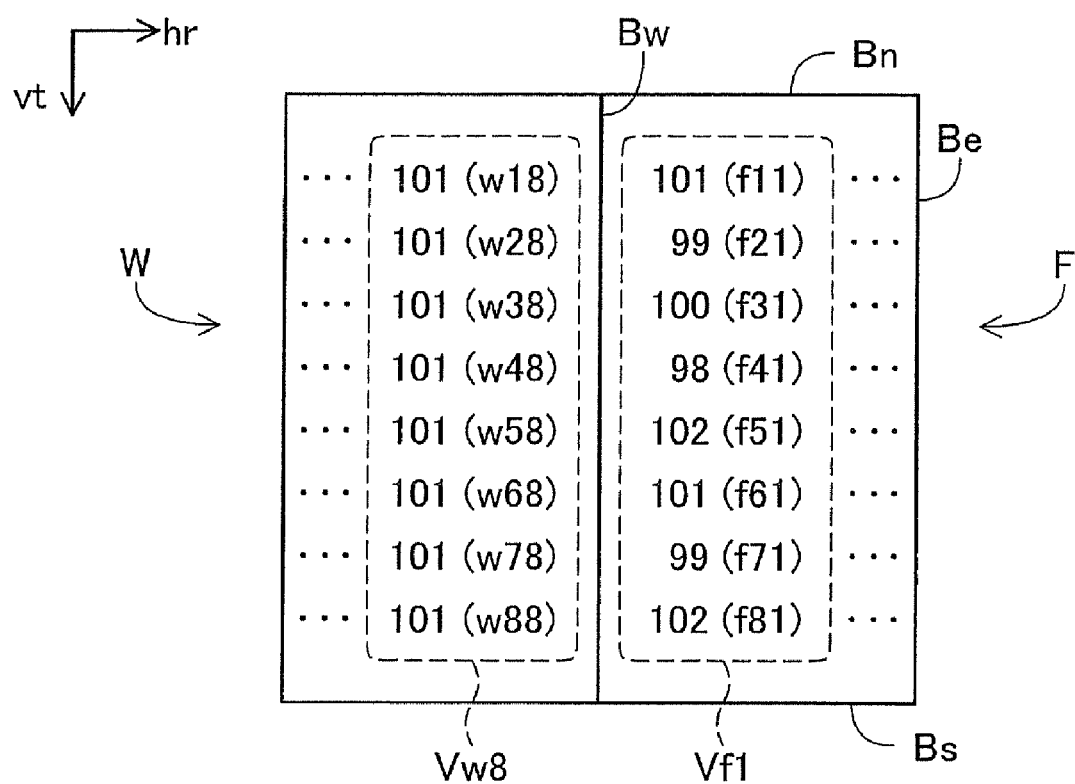
FIG. 33 is a schematic diagram depicting exemplary results of noise addition.

FIG. 33 is a schematic diagram depicting exemplary results of noise addition. This drawing shows an example of addition of noise to the target block F depicted in FIG. 31. As illustrated, dispersion is produced through the addition of noise to the eight pixel values f11 to f81 of the first pixel column Vf1. As a result, discontinuity with the pixel values of the eighth pixel column Vw8 is ameliorated appreciably. Since, in actual practice, noise is added to the eight pixel values w18 to w88 of the eighth pixel column Vw8 as well, discontinuity on the left boundary line Bw can be ameliorated even more appropriately. Furthermore, since the smoothing process is carried out subsequent to the noise addition, the added noise will be suppressed from standing out.

While the description above pertains to the left boundary line Bw, the noise addition process is carried out analogously for the other boundary lines Bn, Be, Bs of the target block F as well. Here, for the horizontal boundary lines Bn, Bs, the noise parameters are determined according to a relationship exchanging the horizontal direction hr and the vertical direction vt. Here, a larger weight may be assigned to the noise as the block noise strength BNS becomes higher.

The noise herein is not limited to the noise depicted in FIG. 32, and it would be possible to employ various other kinds of noise. For example, instead of using random numbers to generate noise, a predetermined noise pattern could be used. It would also be acceptable to add uniform noise that is not dependent on horizontal pixel position hrp or vertical pixel position vtp. However, it will be preferable to employ noise such that variation of pixel values becomes greater with decreasing distance from the boundary line. By so doing, discontinuity on the boundary lines can be eliminated, while suppressing excessive variation in pixel values in the center section of the target block.

It is preferable that the magnitude of noise (i.e. the variation in pixel values resulting from the noise addition) will become greater as the pixel value variation rate at boundary line becomes greater. The index representing this sort of variation rate is not limited to the difference index value Δi discussed above, it being possible to employ various index values having positive correlation with variation rate. For example, the difference between the average value of pixel values within one target block and the average value of pixel values within the other target block could be used. In any case, where greater noise is added as the index value becomes larger, it will be possible to suppress excessive addition of noise while suppressing remaining discontinuities that fail to be eliminated at the boundary lines. Moreover, even where high levels of noise are added, because stronger smoothing is carried out as the block noise strength BNS becomes stronger, noticeable noise can be suppressed.

Also, it is preferable that, in the spatial frequency distribution of the noise, the spatial frequency having the largest peak is higher than a predetermined value. For example, where the largest peak occurs at a spatial frequency higher than one cycle per four pixels, noticeable unevenness of noise can be suppressed.

Moreover, this kind of noise addition may also be carried out in instances where a predetermined condition or conditions have been met. As such a condition, there could be employed the condition that, for example, the block noise strength BNS in relation to a boundary line be stronger than a predetermined threshold value.

In Step S205 of FIG. 30, the smoothing module 424 (FIG. 9, FIG. 26) adds noise to the luminance component Y. The smoothing module 424 may also add noise to the other color components U, V, in addition to the luminance component Y. The same noise as the noise added to the luminance component Y may be employed as the noise added to the color components U, V. Alternatively, noise for the each of the individual color components U, V may be calculated by the same method as for the luminance component Y.

B9. Embodiment 9 of Smoothing Process Utilizing Block Noise Strength:

In the preceding respective embodiments, block noise strength BNS is not limited to a value given by the Numeric Expression 4, and values represented by other computational expressions could be employed instead. For example, a value represented by Numeric Expression 5 could be employed.

$$BNS = \frac{\|2*Vdb - (Vdf + Vdw)\|_1}{2(\|Vdf\|_1 + \|Vdw\|_1)} \quad \text{[Numeric Expression 5]}$$

$\|\ \|_1$: $L1$ NORM

In this Numeric Expression 5, the L1 norm replaces the L2 norm in Numeric Expression 4. The L1 norm is also termed the one-dimensional norm, and is an operation that involves calculating the sum of the absolute values of all of the elements (see Numeric Expression 2). By employing Numeric Expression 5 which uses this L1 norm, it will be possible to calculate the block noise strength BNS through integer operations that include absolute value computations and addition/subtraction computations, rather than n power (where n is an integer of 2 or greater) and n square root computations. As a result, it will be possible to appreciably reduce the computation processing load entailed by the calculations.

In Numeric Expression 5, the L1 norm may be replaced by the maximum norm. The maximum norm is also called the sup norm, and is an operation that involves calculating the maximum value among the absolute values of all elements. In this case as well, it will be possible to calculate the block noise strength BNS without having to compute an n power (where n is an integer of 2 or greater) and n square root. As a result, it will be possible to appreciably reduce the computation processing load.

In general, it will be possible to replace the L1 norm with the p-dimensional norm in Numeric Expression 5 (see Numeric Expression 2). The p-dimensional norm is a generalization of the concept of geometric vector length. Accordingly, using such a norm it will be possible to appropriately calculate a generalized value of differences indicated by the difference column (e.g. Vdb, Vdw, Vdf) (i.e. the pixel value variation rate when pixels are traced along the direction orthogonal to a boundary line, in other words, strength of an edge parallel to a boundary line). As a result, it will be possible to appropriately calculate block noise strength regardless of which norm is used. It is possible to view the maximum norm mentioned above as the limit when the degree p of the p-dimensional norm is set to infinity.

C. Modified Embodiments:

Apart from those elements that are claimed in independent claims, elements appearing in the preceding respective embodiments are optional elements and may be omitted where appropriate. The invention is not limited to the embodiments set forth hereinabove, and may be embodied with various modifications within its scope. It can be embodied according to the following modified embodiments, for example.

Modified Embodiment 1:

In the preceding respective embodiments, the color components representing the colors of pixels of the target image data are not limited to the Y, U, V components, and any color components could be employed instead. For example, the R, G, and B components or the Y, Cb, and Cr components could be employed. In any event, it will be preferable for the color component acquisition module 421 to have a function of converting the original color space (color components) to a predetermined color space represented by luminance and first and second color difference, so as to be able to utilize target image data represented in a color space different from a color space including a luminance component and first and second color difference components. However, such a conversion function may be omitted. The luminance component and the two color difference components are not limited to the Y, U, V components, and various color components could be employed instead. For example, the Y, Cb, and Cr components could be used, or the L, a*, b* components could be used.

Modified Embodiment 2:

In the preceding respective embodiments, as the color component targeted for the smoothing process, it would be possible to employ at least part of components including first color difference component selected from among the luminance component and the first and the second color difference components. For example, the smoothing process could be carried out on the two color difference components, while omitting the smoothing process on the luminance component. However, performing the smoothing process on the luminance component and the first and the second color difference components respectively will have notable noise reducing advantage.

Where the smoothing process is performed on the luminance component and the first and the second color difference components respectively, it will be preferable for the smoothing magnitude of the first color difference component and the smoothing magnitude of the second color difference component at each individual pixel position to be respectively stronger than the smoothing magnitude of the luminance component. By so doing, blurring of the image due to excessive smoothing of the luminance component can be suppressed. Furthermore, noise can be reduced through strong smoothing of the first and the second color difference components respectively.

In any event, it will be preferable for the strongest smoothing process to be performed on the first color difference component, at each individual pixel position. By so doing, excessively strong smoothing of the luminance component can be prevented so as to prevent excessive blurring of the image. Furthermore, noise can be reduced appropriately through strong smoothing of the first color difference component. For a color component that does not undergo a smoothing process, the smoothing magnitude can be said to be set to zero. In general, the colors of color image data can be reproduced using the luminance component and two color difference components. Here, it is possible for any one among the two color difference components to be employed as the aforementioned first color difference component. Also, the smoothing magnitude may differ between the first color difference component and the second color difference component.

Modified Embodiment 3:

In the preceding respective embodiments, the area targeted for the smoothing process may be a partial area within the target image represented by the target image data. For example, the filter modules 420, 420a, 420b (FIG. 3, FIG. 9, FIG. 32) may employ a partial area that has been specified by the user as the area targeted for processing. A partial area that has been specified by an instruction from another device may be employed as well. For example, a target area for the smoothing process may be designated by an identifying device that identifies a partial area representing a specific subject (e.g. a person).

Modified Embodiment 4:

In the preceding respective embodiments, the color component utilized in calculations of the block noise strength is not limited to the luminance component, and various other components could be used. For example, the color difference component U could be used.

Figure 34:
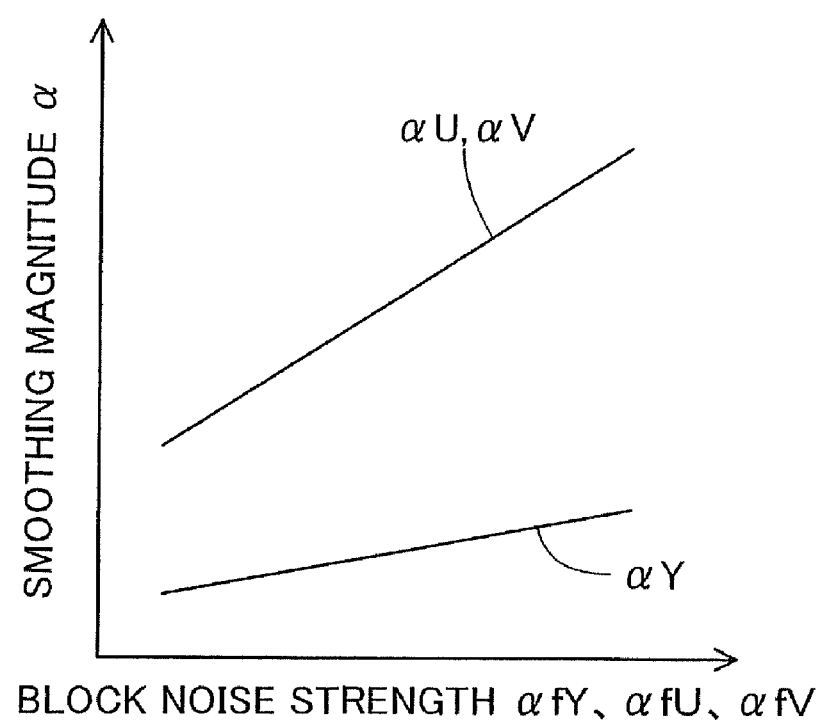
FIG. 34 is a graph depicting relationships between noise strength and smoothing magnitude.

Additionally, the whole of the block noise strength calculations and determinations of smoothing process magnitude according to calculated block noise strength may be carried out on a per-color component basis. FIG. 34 is a graph depicting relationships between noise strength and smoothing magnitude. The only difference from the embodiment depicted in FIG. 18 is that the smoothing magnitudes $\alpha Y$, $\alpha U$, $\alpha V$ of the individual color components Y, U, V are respectively determined depending on block noise strengths $\alpha fY$, $\alpha fU$, $\alpha fV$ of the individual color components Y, U, V. As in the respective embodiments discussed previously, the block noise strengths $\alpha fY$, $\alpha fU$, $\alpha fV$ are calculated on an individual basis for the color components Y, U, V by the noise strength calculation module 422 (FIG. 9, FIG. 26). The smoothing module 424 will determine each smoothing magnitude $\alpha Y$, $\alpha U$, $\alpha V$ in accordance with the graph of FIG. 34. Each smoothing magnitude $\alpha Y$, $\alpha U$, $\alpha V$ is set to become stronger as the block noise strength $\alpha fY$, $\alpha fU$, $\alpha fV$ become stronger, respectively. In the embodiment of FIG. 34, as in the embodiment of FIG. 18, smoothing magnitude $\alpha U$, $\alpha V$ for the two color difference components will be set to the same values for the same noise strength.

Moreover, each noise strength $\alpha fY$, $\alpha fU$, $\alpha fV$ may be mutually different values at individual pixel positions. Thus, in the graph of FIG. 34, the smoothing magnitudes $\alpha U$, $\alpha V$ for the two color difference components are set to sufficiently large values so that they do not reach a value equal to or less than the smoothing magnitude $\alpha Y$ of the luminance component. As a result, at each individual pixel location, the smoothing magnitude $\alpha U$, $\alpha V$ for each color difference component is set to a value stronger than the smoothing magnitude $\alpha Y$ of the luminance component. Additionally, the slope of the smoothing magnitudes $\alpha U$, $\alpha V$ (i.e. the rate of change in smoothing magnitude with respect to change in noise strength) for the color difference components are greater than the slope of the smoothing magnitude $\alpha Y$ of the luminance component. As a result, in relation to the color difference components U, V, strong noise can be reduced through strong smoothing. For the luminance component Y, the smoothing magnitude $\alpha Y$ can be prevented from becoming excessively strong.

Correspondence relationships between noise strength and smoothing magnitude for respective color components are not limited to the correspondence relationships depicted in FIG. 34, and various correspondence relationships could be employed instead. For example, the smoothing intensities $\alpha U$, $\alpha V$ of the color difference components could be respectively set to stronger values than the smoothing magnitude $\alpha Y$ of the luminance component, in relation to any arbitrary combination of respective values of the three types of noise strength $\alpha fY$, $\alpha fU$, $\alpha fV$. Such correspondence relationships may be determined experimentally, through sensory evaluation carried out using various kinds of image data. Determination of noise strength and smoothing magnitude on an individual color component basis as shown in FIG. 34 would be applicable analogously to the respective embodiments depicted in FIGS. 8 to 33 as well.

It would also be acceptable to determine smoothing magnitude for part of color components according to block noise strength, while maintaining smoothing magnitude for the remaining processing color components at predetermined strength. The direction of smoothing may differ for each of color components. In this case as well, smoothing magnitudes may be compared across color components by using test image data like that described in Embodiment 7. As mentioned previously, in such test image data, the shape of the color component pixel value distribution in the test image data will be an isotropic mountain shape with a peak at specific pixel. Smoothing processes employing the same smoothing filter will be carried out on such a test image in its entirety. Then, the pixel value differences between the specific pixel and the eight pixels surrounding it will reduce. The maximum value among these eight amounts of reduction of pixel value differences may be employed as the smoothing magnitude of the smoothing filter. Using this smoothing magnitude, smoothing magnitudes may then be compared across color components. Here, the same pixel value distribution may be utilized to calculate smoothing magnitude for each color component. Such comparison of smoothing magnitude may be carried out analogously both in instances where the smoothing direction of each color component is the same, or where an isotropic smoothing process is carried out.

In any case, it will be preferable for the strongest smoothing process to be carried out on the first color difference component at individual pixel positions. It will also be preferable for the smoothing magnitude of the first color difference component and the smoothing magnitude of the second color difference component to be respectively stronger than the smoothing magnitude of the luminance component at individual pixel positions.

Modified Embodiment 5:

In the respective embodiments described above, the filter modules 420, 420*a*, 420*b* (FIG. 3, FIG. 9, FIG. 32) may generate processed target image data represented by a color space different from the color space that includes the luminance component and the two color difference components. For example, the filter modules 420, 420*a*, 420*b* may generate processed target image data that is represented by the RGB color space. In this case, an output conversion module (not shown) may be employed to convert the color components (the luminance component and the color difference components) which have undergone the smoothing process, into predetermined output color components. Such an output conversion module may be provided to the filter module 420, 420*a*, 420*b*, or provided to another image processing device. In any event, the smoothing module 424 may send image data represented by processed color components (the luminance component and the color difference components) to the output conversion module. Here, the output color components may be different from the color components that represent colors of pixels in the target image data.

Modified Embodiment 6:

In the preceding respective embodiments, it will be possible to employ various calculations as the noise strength calculation for calculating block noise strength at a boundary line between the target pixel block and another pixel block. Here, it is preferable that the noise strength calculation is set in such a way that weaker block noise strength is calculated for larger values of an index indicating magnitude of the pixel value variation rate within the target pixel block. By so doing, the block noise can be reduced while suppressing problem occurrence such as blurring of the image. Various values may be employed as the index. For example, the edge strength BES may be employed, as described in the above respective embodiments. The variance of pixel values within the target block could also be employed. For the variance calculation, the entire target pixel block could be used, or a predetermined partial area therein could be used. A representative value (e.g. the average, the maximum value, the mode, the median, or the minimum value) of the pixel value variation rates at multiple predetermined pixel locations within the target pixel block could be employed as well. For at least some of these various indices, it is preferable that the block noise strength will become weaker as the index value becomes greater. Such an index could also be substituted for the denominator of the computational expression represented by Numeric Expression 4 or Numeric Expression 5. The block noise strength may also vary in stepwise fashion, depending on variation of the index indicating the magnitude of variation rate of pixel values within the target pixel block. In any event, it will be preferable to calculate weaker block noise strength in a case where the index is greater than an index threshold value, as compared with a case where the index is less than the index threshold value. The index threshold value may be determined experimentally, so as to reduce the block noise.

Here, it is preferable for the block noise strength to be set as follows. Specifically, the block noise strength is set to a value obtained by dividing a first calculation value by a second calculation value. Here, the variation rate of pixel values in the direction orthogonal to a boundary line will be termed the orthogonal variation rate. The first calculation value has a first characteristic, namely, of having positive correlation with the quadratic differential of the orthogonal variation rate on the boundary line. The second calculation value has a second characteristic, namely, of having positive correlation with a target variation index that indicates a magnitude of a target variation rate. The target variation rate is the orthogonal variation rate within the target pixel block. The second calculation value has an additional third characteristic, namely, of having positive correlation with a neighboring variation index that indicates a magnitude of a neighboring variation rate. This neighboring variation rate is the orthogonal variation rate within another pixel block. Using such block noise strength, it will be possible to calculate appropriate block noise strength.

Various values having the first characteristic may be employed as the first calculation value. For example, the square root of the MSDS may be employed, as in the respective embodiments above. Or, a representative value (e.g. the average, the maximum value, the mode, the median, or the minimum value) of the quadratic differential of the orthogonal variation rate at multiple predetermined pixel positions on the boundary line may be employed.

Various values that indicate the magnitude of the orthogonal variation rate within the target pixel block could be used as the target variation rate. For example, as in the preceding respective embodiments, the norm of the first internal difference column Vdf could be employed. Alternatively, a representative value (e.g. the average, the maximum value, the mode, the median, or the minimum value) of the orthogonal variation rates at multiple predetermined pixel positions within the target pixel block could be employed. For at least some of these various target variation rates, it is preferable that the second calculation value has a positive correlation with the target variation rate. The above applies analogously to the neighboring variation index. In the preceding respective embodiments, the norm of the second internal difference column Vdw is employed as the neighboring variation index.

The first calculation value, the target variation index, and the neighboring variation index are respectively calculable using a plurality of pixel lines that are orthogonal to the boundary line. It would be possible to use the p-dimensional norm (Numeric Expression 2) in order to generalize the values calculated from the pixel lines. Here, the computation load can be reduced appreciably by using either one among the one-dimensional norm and the maximum norm. The first calculation value, the target variation index, and the neighboring variation index may be respectively calculated from mutually different pixel lines.

In any event, pixel value variation rate means the amount of variation in pixel value per unit length. The unit length is not limited to length equivalent to a single pixel, and it would be possible to employ any length (such as length equivalent to two pixels or length equivalent to three pixels). For example, length equivalent to three pixels could be employed. In this case, differences between pixel columns selected at an interval of two pixels could be used as the difference columns Vdb, Vdw, Vdf utilized in the preceding respective embodiments (Vdb=Vf2−Vw7, Vdw=Vw7−Vw4, Vdf=Vf5−Vf2). However, for the purpose of calculating the strength of block noise which tends to occur on boundary lines, it will be preferable to use a short length (e.g. length equivalent to a single pixel) as the unit length.

Modified Embodiment 7:

In the preceding respective embodiments, it is preferable that the magnitude of the smoothing process is determined on an individual pixel basis within the target pixel block. This will make it easy to reduce block noise, while suppressing problems such as blurring of the image. Embodiments of methods for determining the magnitude of the smoothing process are those in the embodiments shown in FIGS. 20, 21, 22, and 24, for example.

Modified Embodiment 8:

In the preceding respective embodiments, part of the pixels within a pixel block may be employed as target pixels for the smoothing process. For example, some pixels close to boundary lines could be employed. Note that, where the smoothing process is carried out on all of the pixels in the manner described in the preceding respective embodiments, that noise can be suppressed which may occur along boundaries between pixels that have undergone the smoothing process and pixels that have not.

The smoothing filter herein is not limited to those of the embodiments of FIGS. 15, 23, and 29, and it would be possible to employ various filters. For example, a filter range may be larger than 3*3.

Modified Embodiment 9:

In the respective embodiments described above, image data of various kinds may be employed as the target image data. For example, one type of image data is a compressed image data in which part of the data representing the pixel values of the pixels has been omitted. In particular, in certain kinds of compressed image data, a higher proportion of color difference component data will be omitted as compared with the luminance component (e.g. the YUV 422 format or the YUV 420 format). For image data generated through decoding of such compressed image data, stronger noise may occur in the color difference components than in the luminance component. Accordingly, where the above kind of data is employed as the target image data, the noise reduction advantage in the above respective embodiments will be particularly notable.

Additionally, in the respective embodiments described above, the target image data targeted for the smoothing process is not limited to frame image data included in a moving picture, and it would be possible to employ various types of image data. For example, still image data such as JPEG image data or TIFF image data could be employed. Also, the target image data targeted for the smoothing process (deblocking process) with smoothing magnitude adjusted according to the block noise strength is not limited to frame image data included in a moving picture, and it would be possible to employ various types of image data generated through decoding of respective pixel blocks that include a plurality of pixels. For example, image data generated through decoding of JPEG image data could be employed.

Additionally, in the image processing device that carries out the smoothing process, the decoding process module that performs the aforementioned decoding of compressed image data or the aforementioned decoding on an individual pixel block basis may be omitted (in the embodiment of FIG. 2, the selection module 400 corresponds to the decoding process module). In this case, the image processing device may utilize image data that has been decoded by another device as the processing target. In any event, it would be possible to employ any method as the method for acquiring such target image data. For example, target image data could be acquired through a detachable memory card or through a network.

Moreover, it would be possible to employ various methods as the method for identifying pixel block configuration settings (including pixel block size (vertical pixel count and horizontal pixel count)) within the target image data. For example, predetermined configuration settings could be employed. Alternatively, configuration information that (representing the pixel block configuration settings) associated with the target image data could be employed. The target image data and configuration information could be provided to the filter module 420a, 420b (FIG. 9, FIG. 26: modules 421, 422, 423, 424) by various processors (e.g. by the decoding process module mentioned above, or by an external device). Similarly, the decoding process module may identify the pixel block configuration settings through various methods. For example, configuration settings could be identified from analyzing result of the encoded image data, or from information (e.g. header information) associated with the image data.

Modified Embodiment 10:

In the preceding respective embodiments, multiple frames included in a moving image may be synthesized to generate a high-resolution image that represents the same image as the image specified by the user. In this case, the selection module 400 (FIG. 2) may select multiple frames to be used for synthesis. The filter module 420 may carry out the deblocking process on each frame image. The output module 430 may then synthesize the multiple frame images having undergone deblocking, in order to generate a high-resolution image.

Modified Embodiment 11:

In the preceding respective embodiments, the application of the image data generated by the smoothing process is not limited to printing, and various other applications for the data could be employed. For example, in Step S130 of FIG. 4, the output module 430 (FIG. 2) may provide the user with an image data file including the generated image data instead of executing printing (for example, the image data file could be stored in a memory (e.g. the detachable memory card MC (FIG. 1B)) for storing data to be provided to the user; or the image data file could be sent to a communication device connected through a network). Moreover, the smoothing process may be carried out on each frame image during playback of the moving picture. In this way, the image processing device which executes the smoothing process is not limited to the printer 100, and it would be possible to employ any device. For example, it would be possible to employ various devices such as a digital camera, a mobile phone, a personal digital assistance, or a moving picture playback device. Particularly where, as described in Embodiment 9, block noise strength BNS is calculated through integer operations excluding n power (where n is an integer of 2 or greater) and n square root computations, the computation load can be reduced appreciably. As a result, even if the processing capability of the image processing device is not so high, it will be possible to carry out a high speed smoothing process.

Modified Embodiment 12:

In the preceding respective embodiments, the moving picture data format is not limited to the MPEG format, and any format could be employed. Also, progressive scan moving picture data is used in the preceding respective embodiments, it would be possible to use interlaced scan moving picture data instead. In this case, it would be possible to use field images instead of frame images as target images. Alternatively, rather than using a field image in unmodified form, a single frame image reconstructed from two field images could be employed. Such reconstruction of a frame image from field images would be carried out by the selection module 400 (or more generally, the decoding process module that performs decoding of respective pixel blocks.)

Modified Embodiment 13:

In Embodiment 7 above, the method for detecting edge direction is not limited to the method depicted in FIG. 28, and various methods may be employed. For example, the Sobel filter could be used to detect edge direction. However, as shown in FIG. 28, use of the edge strength BES previously calculated for calculating of the block noise strength BNS can reduce the computation load. Various methods could be employed as the method for calculating of the edge direction from edge strength BES. For example, the edge angle could be calculated from the average of the two vertical edge strengths BESw, BESe and the average of the two horizontal edge strengths BESn, BESs.

The anisotropic smoothing filters having mutually different smoothing directions are not limited to the filters shown in FIG. 29, and various filters could be employed. Moreover, the total number of such anisotropic smoothing filters is not limited to four, and various plural numbers may be employed. Here, as in the embodiment of FIG. 29, it will be preferable to prepare a plurality of anisotropic smoothing filters such that the smoothing directions θs are distributed uniformly within the range from −90 to +90 degrees. Furthermore, it is preferable for the total number of anisotropic smoothing filters to be four or greater. In any event, it will be preferable for the smoothing module 424 to select, from among multiple types of smoothing filters with mutually different smoothing directions, the smoothing filter whose smoothing direction most closely approximates the edge direction.

Also, the magnitude of smoothing may vary according to pixel position, as in the embodiment depicted in FIG. 20.

Modified Embodiment 14:

In the preceding respective embodiments, some elements implemented through hardware could instead be implemented through software, and conversely some or all of the elements implemented through software could instead be implemented through hardware. For example, the functions of the filter module 420 of FIG. 2 could be implemented through hardware circuitry having logic circuits.

Where part or all of the functions of the present invention are implemented through software, the software (computer program) for this purpose may be provided in a form stored on a computer-readable recording medium. In the present invention, "computer-readable recording medium" is not limited to portable recording media such as flexible disks or CD-ROM, but also includes internal memory devices in a computer such as various types of RAM and ROM, as well as external storage devices attached to a computer, such as a hard disk.

Modified Embodiment 15:

In the preceding respective embodiments, a stronger smoothing process is carried out as the block noise strength becomes greater. Here, the magnitude of the smoothing process may vary in stepwise fashion depending on variation in block noise strength. In any event, it will be preferable to carry out a stronger smoothing process in a case where the block noise strength is greater than a strength threshold value, as compared with a case where the block noise strength is lower than the strength threshold value. The strength threshold value may be determined experimentally, so as to reduce the block noise.

Modified Embodiment 16:

In the embodiments depicted in FIGS. 21 and 22, the block noise strengths of the four boundary lines are used in the smoothing process by assigning weights to the block noise strengths respectively, here the weight becomes larger with decreasing distance between the respective boundary line and the pixel targeted for the smoothing process. Here, the weight may vary in stepwise fashion depending on change in distance. In any event, it will be preferable to assign a larger weight to the block noise strength in a case where the distance is shorter than a distance threshold value, as compared with a case where the distance is greater than the distance threshold value. The distance threshold value may be determined experimentally beforehand, so as to reduce the block noise.

Modified Embodiment 17:

While various aspects of the present invention have been shown herein, there are other possible aspects such as the following.

Aspect 2. The image processing device according to the first aspect, wherein the smoothing processor carries out a smoothing process on the luminance component and on the first and the second color difference components respectively; and for the first color difference component and the second color difference component respectively, carries out a smoothing process of stronger magnitude than the magnitude of the smoothing process carried out on the luminance component.

According to this arrangement, since a weaker smoothing process will be executed on the luminance component, noise can be reduced and excessive blurring of the image can be prevented. Also, since a stronger smoothing process will be executed on the first and the second color difference components, noise can be reduced appropriately.

Aspect 3. The image processing device according to any of Aspects 1 to 2, wherein the target image data is image data generated through decoding of respective pixel blocks including a plurality of pixels;

the image processing device further comprises:

a noise strength calculator that, in relation to a specific color component among the color components targeted for a smoothing process including the first color difference component, calculates block noise strength at a boundary line between a target pixel block within the target image data and another pixel block neighboring the target pixel block by a predetermined noise strength calculation using the target image data, wherein the smoothing processor, in relation to the specific color component, carries out a stronger smoothing process in a case where the block noise strength is greater than a strength threshold value as compared with a case where the block noise strength is less than the strength threshold value, for at least partial area within the target pixel block, and the noise strength calculation is set so as to calculate weaker block noise strength in a case where an index is greater than an index threshold value as compared with a case where the index is smaller than the index threshold value, the index indicating magnitude of a variation rate of pixel values within the target pixel block.

According to this arrangement, weak smoothing process will be executed in a case where the variation rate in pixel values within a target pixel block is large, block noise can be reduced, while suppressing problems such as blurring of the image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device for processing target image data, comprising:
    a computer-readable medium having stored thereon target image data generated through decoding of respective pixel blocks including a plurality of pixels;
    a processor configured as a color component acquisition unit that reads target image data from the computer-readable medium and acquires a luminance component, a first color difference component, and a second color difference component which represent color of respective pixels;
    a processor configured as a smoothing processor that, at individual pixel positions of at least a partial area of a target image represented by the target image data, carries out a maximum magnitude smoothing process on the first color difference component, among the luminance component, the first color difference component, and the second color difference component, and writes processed target image data to the computer-readable medium;
    a processor configured as a noise strength calculator that, in relation to a specific color component among the color components targeted for a smoothing process including the first color difference component, calculates block noise strength at a boundary line between a target pixel block within the target image data and another pixel block neighboring the target pixel block by a predetermined noise strength calculation using the target image data;
    wherein the smoothing processor, in relation to the specific color component, carries out a stronger smoothing process in a case where the block noise strength is greater than a strength threshold value as compared with a case where the block noise strength is less than the strength threshold value for at least a partial area within the target pixel block; and
    wherein the noise strength calculation is set so as to calculate weaker block noise strength in a case where an index is greater than an index threshold value as compared with a case where the index is smaller than the index threshold value, the index indicating a magnitude of a variation rate of pixel values within the target pixel block.

2. The image processing device according to claim 1, wherein
    the smoothing processor carries out a smoothing process on the luminance component and on the first and the second color difference components respectively; and
    for the first color difference component and the second color difference component respectively, carries out a smoothing process of stronger magnitude than the magnitude of the smoothing process carried out on the luminance component.

3. An image processing method for processing target image data, comprising:
    generating target image data by decoding respective pixel blocks that include a plurality of pixels,
    acquiring from target image data a luminance component, a first color difference component, and a second color difference component which represent color of respective pixels;
    calculating a block noise strength at a boundary line between a target pixel block within the target image data and another pixel block neighboring the target pixel block by a predetermined noise strength calculation using the target image data wherein the calculation is in relation to a specific color component among the color components targeted for a smoothing process including the first color difference component;
    carrying out a maximum magnitude smoothing process on the first color difference component, among the luminance component, the first color difference component, and the second color difference component, at individual pixel positions of at least a partial area of a target image represented by the target image data;
    wherein the smoothing process, in relation to the specific color component, is stronger in a case where the block noise strength is greater than a strength threshold value as compared with a case where the block noise strength is less than the strength threshold value for at least a partial area within the target pixel block; and
    wherein the noise strength calculation is set so as to calculate weaker block noise strength in a case where an index is greater than an index threshold value as compared with a case where the index is smaller than the index threshold value, the index indicating a magnitude of a variation rate of pixel values within the target pixel block.

4. A computer program stored on a non-transitory computer-readable medium, said program for processing target image data, the program comprising:
    a first program for causing a computer to acquire from target image data a luminance component, a first color difference component, and a second color difference component which represent color of respective pixels; and
    a second program for causing the computer to carry out a maximum magnitude smoothing process on the first color difference component, among the luminance component, the first color difference component, and the second color difference component, at individual pixel positions of at least a partial area of a target image represented by the target image data;
    a noise strength calculator that, in relation to a specific color component among the color components targeted for a smoothing process including the first color difference component, calculates block noise strength at a boundary line between a target pixel block within the target image data and another pixel block neighboring the target pixel block by a predetermined noise strength calculation using the target image data;
    wherein the second program, in relation to the specific color component, carries out a stronger smoothing process in a case where the block noise strength is greater than a strength threshold value as compared with a case where the block noise strength is less than the strength threshold value for at least a partial area within the target pixel block;
    wherein the noise strength calculation is set so as to calculate weaker block noise strength in a case where an index is greater than an index threshold value as compared with a case where the index is smaller than the index threshold value, the index indicating a magnitude of a variation rate of pixel values within the target pixel block; and
    wherein the target image data is image data generated through decoding of respective pixel blocks including a plurality of pixels.

* * * * *